(12) United States Patent
Marubashi

(10) Patent No.: US 11,178,911 B2
(45) Date of Patent: Nov. 23, 2021

(54) AEROSOL INHALER AND CONTROL DEVICE OF AEROSOL INHALER

(71) Applicant: JAPAN TOBACCO INC., Tokyo (JP)

(72) Inventor: Keiji Marubashi, Tokyo (JP)

(73) Assignee: JAPAN TOBACCO INC., Tokyo (JP)

(*) Notice: Subject to any disclaimer, the term of this patent is extended or adjusted under 35 U.S.C. 154(b) by 0 days.

(21) Appl. No.: 17/082,038

(22) Filed: Oct. 28, 2020

(65) Prior Publication Data
US 2021/0120883 A1    Apr. 29, 2021

(30) Foreign Application Priority Data

Oct. 28, 2019   (JP) .............................. JP2019-195602

(51) Int. Cl.
| | | |
|---|---|---|
| *A24F 40/57* | (2020.01) | |
| *A24F 40/51* | (2020.01) | |
| *A24F 40/46* | (2020.01) | |
| *H05B 1/02* | (2006.01) | |
| *H05B 3/00* | (2006.01) | |
| *H02J 7/00* | (2006.01) | |
| *H02J 7/34* | (2006.01) | |

(52) U.S. Cl.
CPC .............. *A24F 40/57* (2020.01); *A24F 40/46* (2020.01); *A24F 40/51* (2020.01); *H05B 1/0297* (2013.01); *H05B 3/0014* (2013.01); *H05B 3/0019* (2013.01); *H02J 7/0042* (2013.01); *H02J 7/345* (2013.01)

(58) Field of Classification Search
None
See application file for complete search history.

(56) References Cited

U.S. PATENT DOCUMENTS

| | | | |
|---|---|---|---|
| 8,499,766 B1* | 8/2013 | Newton .................. | A24F 40/40 131/273 |
| 9,603,386 B2* | 3/2017 | Xiang ..................... | A24F 40/50 |
| 9,675,114 B2* | 6/2017 | Timmermans .......... | A24F 40/50 |
| 9,808,032 B2* | 11/2017 | Yamada ............... | H05B 3/0014 |

(Continued)

FOREIGN PATENT DOCUMENTS

| | | |
|---|---|---|
| CN | 110250580 A | 9/2019 |
| JP | 11-251908 A | 9/1999 |

(Continued)

OTHER PUBLICATIONS

Office Action dated Apr. 9, 2021, in corresponding European patent Application No. 20204363.4, 6 pages.

(Continued)

*Primary Examiner* — Thor S Campbell
(74) *Attorney, Agent, or Firm* — Xsensus LLP

(57) ABSTRACT

A control device of an aerosol inhaler including a load heating an aerosol generation source, in which a temperature and an electric resistance value of the load are correlated. The control device includes: a voltage sensor configured to output a voltage value applied to the load; a known resistor which is connected in series to the load; and a control circuit configured to acquire the temperature of the load based on output of the voltage sensor. The control circuit is configured such that a resolution of the temperature of the load acquired based on the output of the voltage sensor is 10 [° C.] or less.

11 Claims, 18 Drawing Sheets

(56) References Cited

U.S. PATENT DOCUMENTS

| | | | |
|---|---|---|---|
| 2013/0319435 A1 | 12/2013 | Flick | |
| 2014/0299141 A1 | 10/2014 | Flick | |
| 2018/0077967 A1 | 3/2018 | Hatton et al. | |
| 2019/0124979 A1* | 5/2019 | Sebastian | H05B 6/108 |
| 2019/0200677 A1* | 7/2019 | Chong | A24D 1/02 |
| 2019/0230987 A1* | 8/2019 | Wu | H05B 3/42 |
| 2020/0008482 A1* | 1/2020 | He | H05B 1/0227 |
| 2020/0260793 A1 | 8/2020 | Yamada et al. | |
| 2020/0278707 A1* | 9/2020 | Sur | A24F 40/50 |
| 2020/0337382 A1* | 10/2020 | Sur | A61M 15/06 |
| 2020/0352246 A1* | 11/2020 | Yamada | A24F 40/51 |
| 2021/0127754 A1* | 5/2021 | Tatsuta | H02J 7/0044 |

FOREIGN PATENT DOCUMENTS

| | | | |
|---|---|---|---|
| JP | 2014-501107 A | 1/2014 | |
| JP | 2014-530632 A | 11/2014 | |
| WO | 2018/170802 A1 | 9/2018 | |
| WO | 2019/082264 A1 | 5/2019 | |
| WO | WO-2019082264 A1 * | 5/2019 | A24F 40/44 |
| WO | 2019/146061 A1 | 8/2019 | |
| WO | 2019/146063 A1 | 8/2019 | |

OTHER PUBLICATIONS

Japanese Decision to Grant dated Dec. 8, 2020, in corresponding Japanese Patent Application No. 2019-195602.

Japanese Notice of Reasons for Refusal dated Jul. 14, 2020, in corresponding Japanese Patent Application No. 2019-195602.

Japanese Notice of Reasons for Refusal dated Feb. 12, 2020, in corresponding Japanese Patent Application No. 2019-195602.

Office Action received for Japanese Patent Application No. 2019-195602, dated Feb. 12, 2020, 10 pages including English Translation.

Office Action received for Japanese Patent Application No. 2019-195602, dated Jul. 14, 2020, 11 pages including English Translation.

* cited by examiner

FIG. 18

| MATERIAL OF LOAD | RESISTANCE TEMPERATURE COEFFICIENT α [ppm/°C] | ELECTRIC RESISTANCE VALUE OF SHUNT RESISTOR Rs [Ω] | TEMPERATURE RESOLUTION Res [°C] | | |
|---|---|---|---|---|---|
| | | | NO OPTIMIZATION OF REFERENCE VOLTAGE $V_{REF}$ NO OPTIMIZATION OF AMPLIFICATION FACTOR A | WITH OPTIMIZATION OF REFERENCE VOLTAGE $V_{REF}$ NO OPTIMIZATION OF AMPLIFICATION FACTOR A | WITH OPTIMIZATION OF REFERENCE VOLTAGE $V_{REF}$ WITH OPTIMIZATION OF AMPLIFICATION FACTOR A |
| NICHROME | 100 | <10 | 40~120 | 20~120 | 20~120 |
| | | 10~25 | 120~300 | 16~35 | 16~35 |
| | | >25 | 300~ | 35~ | 10~16 |
| | 200 | <10 | 20~60 | 9~60 | 9~60 |
| | | 10~25 | 60~150 | 8~18 | 8~18 |
| | | >25 | 150~ | 18~ | 5~8 |
| STAINLESS STEEL | 1000 | <10 | 4~30 | 2~30 | 2~30 |
| | | 10~25 | 30~75 | 2~3.5 | 2~3.5 |
| | | >25 | 75~ | 3.5~ | 1~2 |
| TUNGSTEN | 4000 | <10 | 1~7.5 | 0.5~7.5 | 0.5~7.5 |
| | | 10~25 | 7.5~20 | 0.4~0.9 | 0.4~0.9 |
| | | >25 | 20~ | 0.9~ | 0.3~0.4 |

PATTERN 1 ☐ TEMPERATURE RESOLUTION: ROUGH (QUALITY OF CONTROL BASED ON TEMPERATURE T IS DETERIORATED)
PATTERN 2 ▒ TEMPERATURE RESOLUTION: MEDIUM (QUALITY OF CONTROL OTHER THAN TEMPERATURE CONTROL BASED ON TEMPERATURE T CAN BE SEQURED)
PATTERN 3 ▨ TEMPERATURE RESOLUTION: FINE (QUALITY OF TEMPERATURE CONTROL BASED ON TEMPERATURE T CAN BE SEQURED)

AEROSOL INHALER AND CONTROL DEVICE OF AEROSOL INHALER

CROSS-REFERENCE TO RELATED APPLICATIONS

The present application is based on and claims priority under 35 USC 119 from Japanese Patent Application No. 2019-195602 filed on Oct. 28, 2019, the contents of which are incorporated herein by reference.

TECHNICAL FIELD

The present disclosure relates to a control device of an aerosol inhaler and an aerosol inhaler.

BACKGROUND ART

In an aerosol inhaler, an electric resistance value and a temperature of a load (for example, a heater) configured to atomize an aerosol source are used for various controls, such as load identification and load heating. As a technique for acquiring the electric resistance value or the like of such a load, Patent Literature 1 (WO2019/082264) describes a technique in which a current value flowing through a resistor connected in series to a load for generating an aerosol or a voltage value applied to the resistor is measured by a sensor. Moreover, Patent Literature 2 (JP-T-2014-501107) describes a technique in which a voltage dividing circuit capable of measuring an electric resistance value of a load (heater) is provided.

However, the above Patent Literature 1 and Patent Literature 2 do not consider accuracy of a temperature of the load that should be required for an aerosol inhaler.

Control accuracy may be decreased when the accuracy of the temperature of the load is low, while a cost and a size of the aerosol inhaler may be increased when the required accuracy of the temperature of the load is excessively high.

The present disclosure provides a control device of an aerosol inhaler and an aerosol inhaler which are capable of acquiring the temperature of the load with appropriate accuracy.

SUMMARY

In a first aspect of the disclosure, a control device of an aerosol inhaler including a load heating an aerosol generation source, in which a temperature and an electric resistance value of the load are correlated. The control device includes: a voltage sensor configured to output a voltage value applied to the load; a known resistor which is connected in series to the load; and a control circuit configured to acquire the temperature of the load based on output of the voltage sensor. The control circuit is configured such that a resolution of the temperature of the load acquired based on the output of the voltage sensor is 10 [° C.] or less.

In a second aspect of the disclosure, an aerosol inhaler includes: a load, which is configured to heat an aerosol generation source and is formed of stainless steel or nichrome having a resistance temperature coefficient of 200 [ppm/° C.] or more. The aerosol inhaler further includes: a voltage sensor configured to output a voltage value applied to the load; a known resistor which is connected in series to the load; and a control circuit configured to acquire a temperature of the load based on output of the voltage sensor.

BRIEF DESCRIPTION OF DRAWINGS

FIG. 18 illustrates an example of values that the temperature resolution can take under each condition.

DESCRIPTION OF EMBODIMENTS

Figure 1:
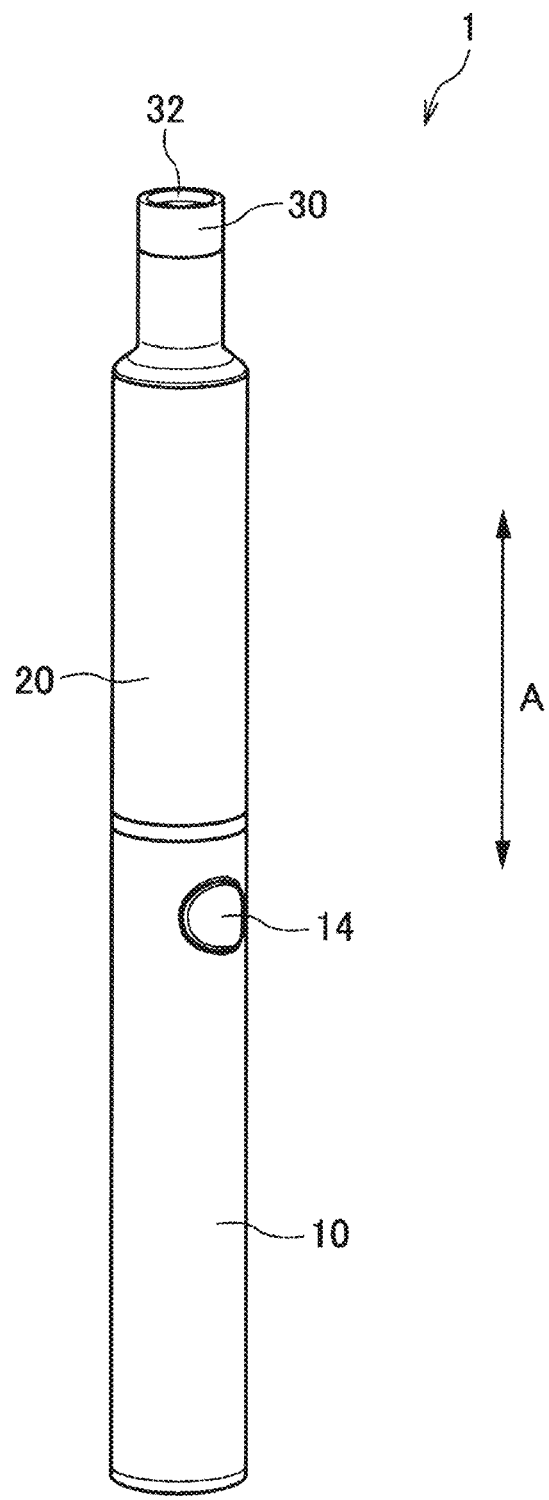
FIG. 1 is a perspective view of an aerosol inhaler equipped with a power supply unit of one embodiment of the present disclosure.
Figure 2:
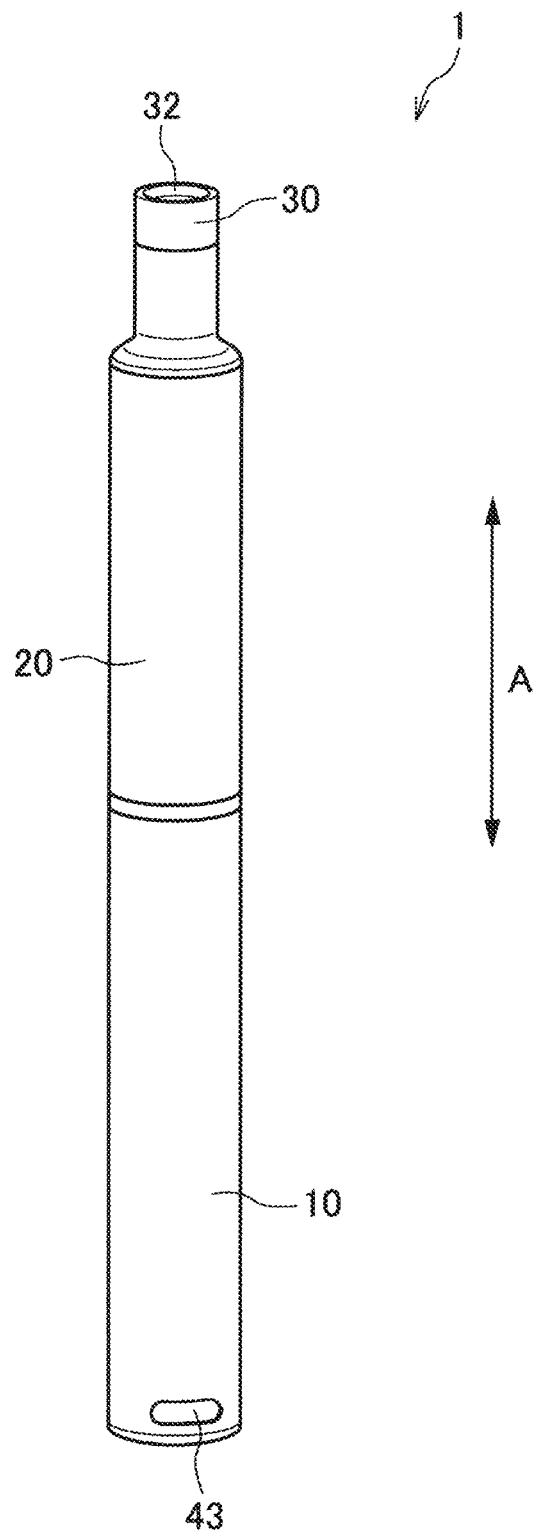
FIG. 2 is another perspective view of the aerosol inhaler of FIG. 1.

Hereinafter, one embodiment of the present disclosure will be described. The embodiment described below is an example in a case where a control device of an aerosol inhaler and an aerosol inhaler of the present disclosure are applied to an aerosol inhaler power supply unit and an aerosol inhaler which includes the power supply unit. First, the aerosol inhaler will be described with reference to FIGS. 1 and 2.

(Aerosol Inhaler)

An aerosol inhaler 1 is an instrument for inhaling a flavored aerosol without burning, and has a rod shape extending along a predetermined direction (hereinafter referred to as a longitudinal direction X).

In the aerosol inhaler 1, a power supply unit 10, a first cartridge 20, and a second cartridge 30 are provided in such an order along the longitudinal direction X. The first cartridge 20 is attachable to and detachable from the power supply unit 10. The second cartridge 30 is attachable to and detachable from the first cartridge 20. In other words, the first cartridge 20 and the second cartridge 30 are replaceable.

(Power Supply Unit)

The power supply unit 10 of the present embodiment is an example of a control device of the present disclosure. As illustrated in FIGS. 3, 4, 5, and 6, a power supply 12, a charger 13, a control circuit 50, and various sensors, such as an intake sensor 15, are accommodated inside a cylindrical power supply unit case 11. The power supply 12 is a rechargeable secondary battery, an electric double layer capacitor, or the like, and is preferably a lithium ion secondary battery. An electrolyte of the power supply 12 may be constituted by one of a gel electrolyte, an electrolytic solution, a solid electrolyte, an ionic liquid, or a combination thereof. The control circuit 50 is, for example, a micro controller unit (MCU).

Figure 4:
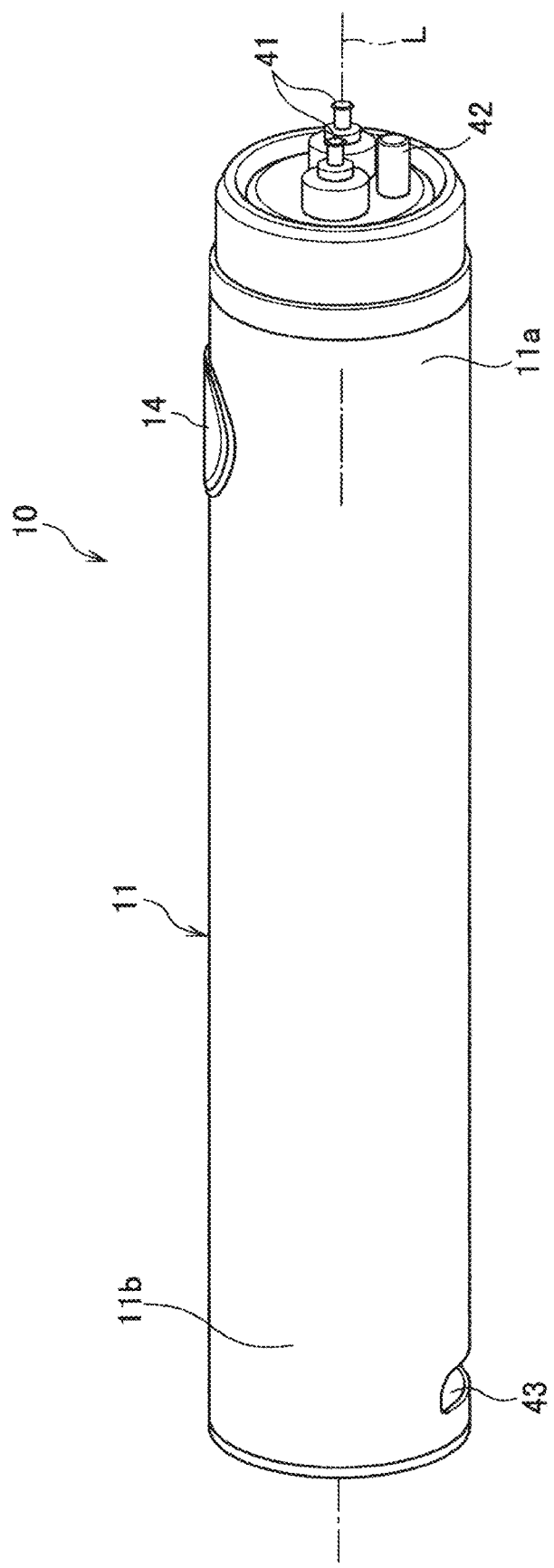
FIG. 4 is a perspective view of the power supply unit of the aerosol inhaler of FIG. 1.

As illustrated in FIG. 4, a discharge terminal 41 is provided on a top portion 11a located on one end side (side of the first cartridge 20) of the power supply unit case 11 in the longitudinal direction X. The discharge terminal 41 protrudes from an upper surface of the top portion 11a toward the first cartridge 20, and is configured to be electrically connectable to a load 21 of the first cartridge 20.

An air supply unit 42 configured to supply air to the load 21 of the first cartridge 20 is provided on the upper surface of the top portion 11a in the vicinity of the discharge terminal 41.

A charge terminal 43 that is electrically connectable to an external power supply (not illustrated) capable of charging the power supply 12 is provided on a bottom portion 11b located on the other end side (side opposite to the first cartridge 20) of the power supply unit case 11 in the longitudinal direction X. The charge terminal 43 is provided on a side surface of the bottom portion 11b, and at least one of a USB terminal, a micro USB terminal, or a Lightning (registered trademark) terminal can be connected thereto, for example.

The charge terminal 43 may be a power receiving unit capable of wirelessly receiving power transmitted from the external power supply. In such a case, the charge terminal 43 (power receiving unit) may be configured by a power receiving coil. The method of wirelessly transmitting power (wireless power transfer) may be an electromagnetic induction type or a magnetic resonance type. Moreover, the charge terminal 43 may also be a power receiving unit capable of receiving power transmitted from the external power supply in a non-contact manner. As another example, the charge terminal 43 is connectable with at least one of a USB terminal, a micro USB terminal, and a Lightning terminal, and may include the power receiving unit described above.

Figure 3:
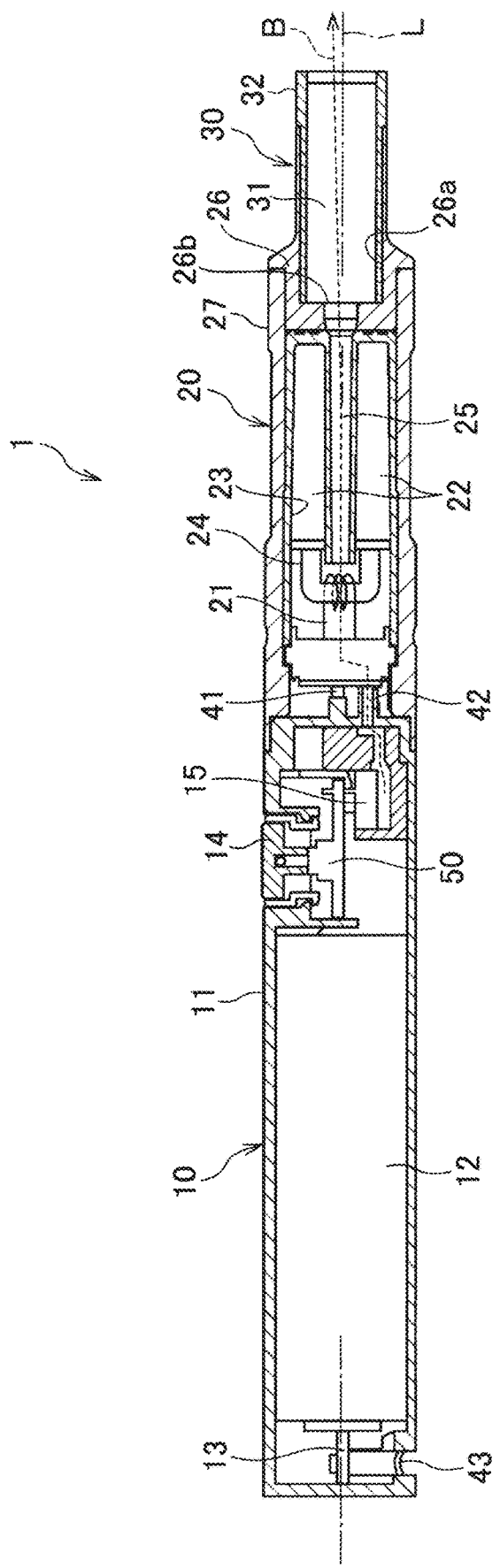
FIG. 3 is a cross-sectional view of the aerosol inhaler of FIG. 1.

An operation portion 14 that can be operated by a user is provided in the power supply unit case 11 so as to face a side opposite to the charge terminal 43 on a side surface of the top unit 11a. More specifically, the operation portion 14 and the charge terminal 43 have a point-symmetric relationship with respect to an intersection of a straight line connecting the operation portion 14 and the charge terminal 43 and a center line of the power supply unit 10 in the longitudinal direction X. The operation portion 14 is configured by a button type switch, a touch panel, or the like. As illustrated in FIG. 3, the intake sensor 15 configured to detect a puff operation is provided in the vicinity of the operation portion 14.

The charger 13 is arranged in proximity to the charge terminal 43, and controls charging of power input from the charge terminal 43 to the power supply 12. The charger 13 may also be arranged in the vicinity of the control circuit 50.

Figure 5:
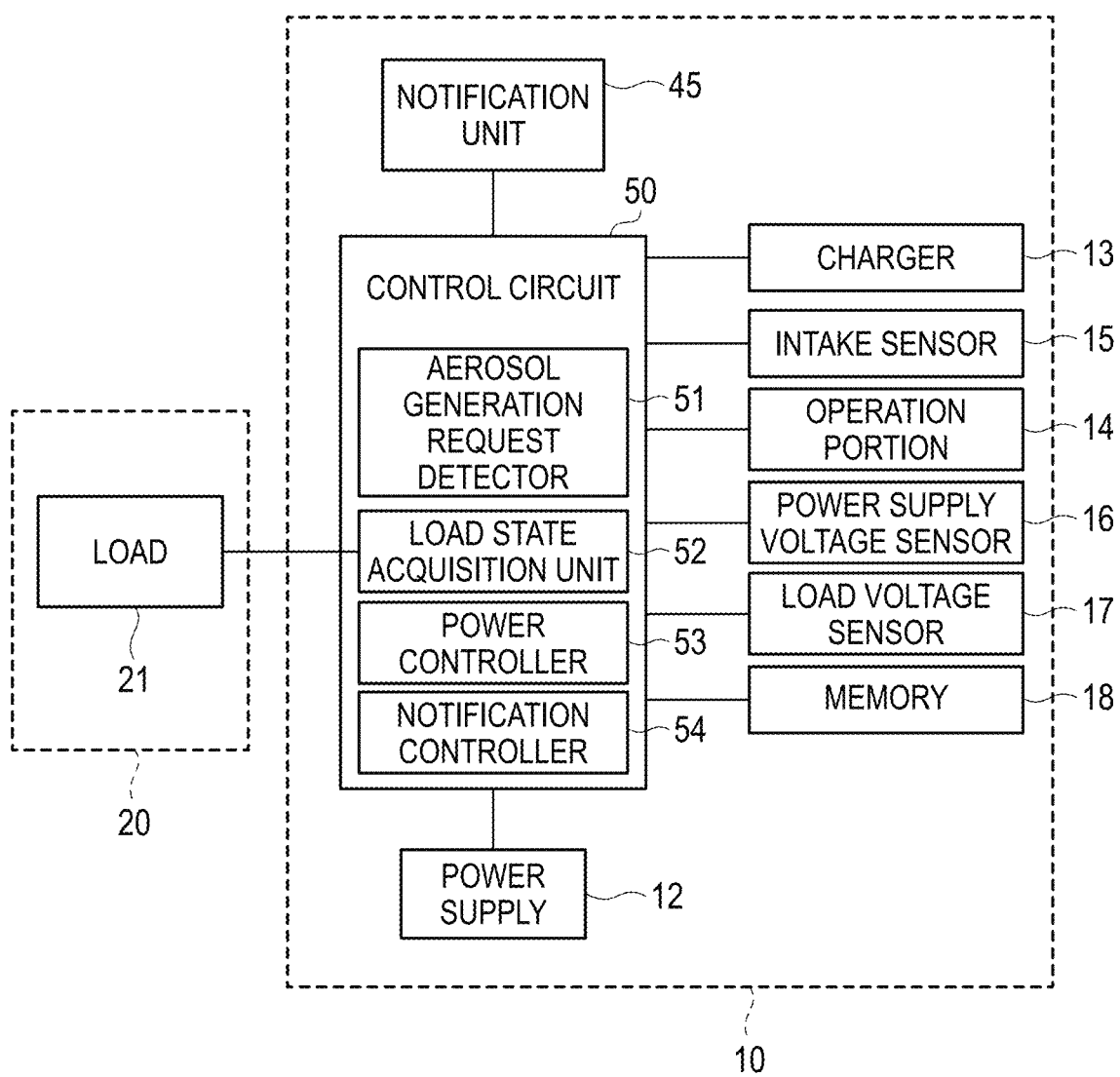
FIG. 5 is a block diagram illustrating a functional configuration of the aerosol inhaler of FIG. 1.

The control circuit 50 is, as illustrated in FIG. 5, connected to various sensor devices such as the intake sensor 15 configured to detect the puff (intake) operation, a circuit voltage sensor 16 configured to measure a voltage of the power supply 12, and a load voltage sensor 17 configured to measure a voltage applied to the load 21, the operation portion 14, a notification unit 45 to be described below, and a memory 18 configured to store the number of times of puff operations, a time of energization to the load 21 and the like. The control circuit 50 performs various controls of the aerosol inhaler 1. Specifically, the control circuit 50 mainly includes a processor 55 (see FIG. 7), which will be described below, and further includes storage media, such as a random access memory (RAM) necessary for the processor 55 to operate and a read only memory (ROM) configured to store various types of information. More specifically, the processor in the present specification is an electric circuit in which circuit elements such as semiconductor elements are combined.

The power supply unit case 11 is provided with an air intake opening (not illustrated) configured therein to take in outside air. The air intake opening may be provided around the operation portion 14, or may be provided around the charge terminal 43.

(First Cartridge)

As illustrated in FIG. 3, inside a cylindrical cartridge case 27, the first cartridge 20 includes: a reservoir 23 configured to store an aerosol source 22; the electric load 21 configured to atomize the aerosol source 22; a wick 24 configured to draw the aerosol source from the reservoir 23 to the load 21; an aerosol flow path 25 through which an aerosol generated by the atomization of the aerosol source 22 flows toward the second cartridge 30; and an end cap 26 configured to accommodate a part of the second cartridge 30.

The reservoir 23 is partitioned and formed so as to surround a periphery of the aerosol flow path 25, and stores the aerosol source 22. A porous body, such as a resin web or cotton, may be accommodated in the reservoir 23, and the aerosol source 22 may be impregnated in the porous body. The reservoir 23 may only store the aerosol source 22 without accommodating the resin web or the cotton porous body. The aerosol source 22 includes a liquid, such as glycerin, propylene glycol, or water.

The wick 24 is a liquid holding member configured to draw the aerosol source 22 from the reservoir 23 to the load 21 by utilizing a capillary phenomenon. The wick 24 is made of, for example, glass fiber or porous ceramic.

The load 21 performs atomization by heating the aerosol source 22 by power supplied from the power supply 12 via the discharge terminal 41 without burning. The load 21 is formed of an electric heating wire (coil) wound at a predetermined pitch.

The load 21 may be any element that can perform atomization by heating the aerosol source 22 to generate the aerosol. The load 21 is, for example, a heating element. Examples of the heating element include a heating resistor, a ceramic heater, and an induction heating type heater. Hereinafter, an electric resistance value of the load 21 will be referred to as an electric resistance value RH.

A load whose temperature and electric resistance value are correlated is used as the load 21. More specifically, a load having a positive temperature coefficient (PTC) characteristic, which causes the electric resistance value to increase as the temperature increases, is used as the load 21. An example of the load 21 having the PTC characteristic is NiCr (nichrome). The load 21 having the PTC characteristic can also be realized by stainless steel, tungsten, or the like. The PTC characteristic is also referred to as a positive resistance temperature coefficient characteristic.

A coefficient indicating magnitude of an amount of change in the electric resistance value of the load 21 with respect to an amount of change in the temperature of the load 21 is referred to as a resistance temperature coefficient α [ppm (parts per million)/° C.]. The resistance temperature coefficient α can be expressed by the following formula (F1), where T refers to the temperature of the load 21, $T_{REF}$ refers to a reference temperature, and $R_{REF}$ refers to a reference electric resistance value.

[Formula 1]

$$\alpha[ppm/°\text{C.}] = \frac{R_H - R_{REF}}{R_{REF}} \cdot \frac{1}{T - T_{REF}} \cdot 10^6 \quad (F1)$$

For example, information indicating the resistance temperature coefficient α [ppm/° C.] of the load 21 is stored in advance in the power supply unit 10 (for example, the memory 18 to be described below).

The aerosol flow path 25 is downstream of the load 21 and is provided on a center line L of the power supply unit 10. The end cap 26 includes: a cartridge accommodating portion 26a configured to accommodate a part of the second cartridge 30; and a communication path 26b configured to communicate the aerosol flow path 25 and the cartridge accommodating portion 26a.

(Second Cartridge)

The second cartridge 30 stores a flavor source 31. The second cartridge 30 is detachably accommodated in the cartridge accommodating portion 26a provided in the end cap 26 of the first cartridge 20. An end portion, which is located on a side opposite to the side of the first cartridge 20, of the second cartridge 30 serves as a user inhale opening 32. The inhale opening 32 is not limited to be formed integrally with the second cartridge 30, and may also be detachable from the second cartridge 30. By forming the inhale opening 32 separately from the power supply unit 10 and the first cartridge 20 in this way, the inhale opening 32 can be kept hygienic.

The second cartridge 30 passes the aerosol generated by atomizing the aerosol source 22 by the load 21 through the flavor source 31 and thus imparts a flavor to the aerosol. Chopped tobacco or a molded body obtained by molding a tobacco raw material into particles can be used as a raw material piece that forms the flavor source 31. The flavor source 31 may also be formed of a plant other than tobacco (for example, mint, Chinese herb, or herb). The flavor source 31 may be provided with a fragrance such as menthol.

In the aerosol inhaler 1 of the present embodiment, the flavored aerosol can be generated by the aerosol source 22, the flavor source 31, and the load 21. That is, the aerosol source 22 and the flavor source 31 constitute an aerosol generation source that generates the aerosol.

The aerosol generation source of the aerosol inhaler 1 is a portion that is replaced and used by the user. As this portion, for example, one first cartridge 20 and one or a plurality of (for example, five) second cartridges 30 are provided to the user as a set.

In addition to a configuration in which the aerosol source 22 and the flavor source 31 are separated from each other, a configuration in which the aerosol source 22 and the flavor source 31 are integrally formed, a configuration in which the flavor source 31 is omitted and substances that may be included in the flavor source 31 are added to the aerosol source 22, or a configuration in which a medicine or the like is added to the aerosol source 22 instead of the flavor source 31 may also be employed as the configuration of the aerosol generation source used in the aerosol inhaler 1.

In a case where the aerosol inhaler 1 includes the aerosol generation source in which the aerosol source 22 and the flavor source 31 are integrally formed, for example, one or a plurality of (for example, 20) aerosol generation sources are provided as a set to the user.

In a case where the aerosol inhaler 1 only includes the aerosol source 22 as the aerosol generation source, for example, one or a plurality of (for example, 20) aerosol generation sources are provided as a set to the user.

In the aerosol inhaler 1 configured in this way, as indicated by arrow B in FIG. 3, air flowing in from the intake opening (not illustrated) provided in the power supply unit case 11 passes through the vicinity of the load 21 of the first cartridge 20 from the air supply unit 42. The load 21 atomizes the aerosol source 22 drawn from the reservoir 23 by the wick 24. The aerosol generated by the atomization flows through the aerosol flow path 25 together with the air flowing in from the intake opening, and is supplied to the second cartridge 30 via the communication path 26b. The aerosol supplied to the second cartridge 30 passes through the flavor source 31 so as to be flavored, and is then supplied to the inhale opening 32.

The aerosol inhaler 1 is provided with the notification unit 45 configured to notify various types of information (see FIG. 5). The notification unit 45 may be configured by a light emitting element, a vibrating element, or a sound output element. The notification unit 45 may also be a combination of two or more elements among the light emitting element, the vibrating element, and the sound output element. The notification unit 45 may be provided in any one of the power supply unit 10, the first cartridge 20, and the second cartridge 30, and is preferably provided in the power supply unit 10. For example, a configuration in which a periphery of the operation portion 14 has a light-transmitting property and light is emitted by a light emitting element such as an LED is employed.

(Electric Circuit of Power Supply Unit)

Next, a main part of an electric circuit of the power supply unit 10 will be described with reference to FIG. 6.

Figure 6:
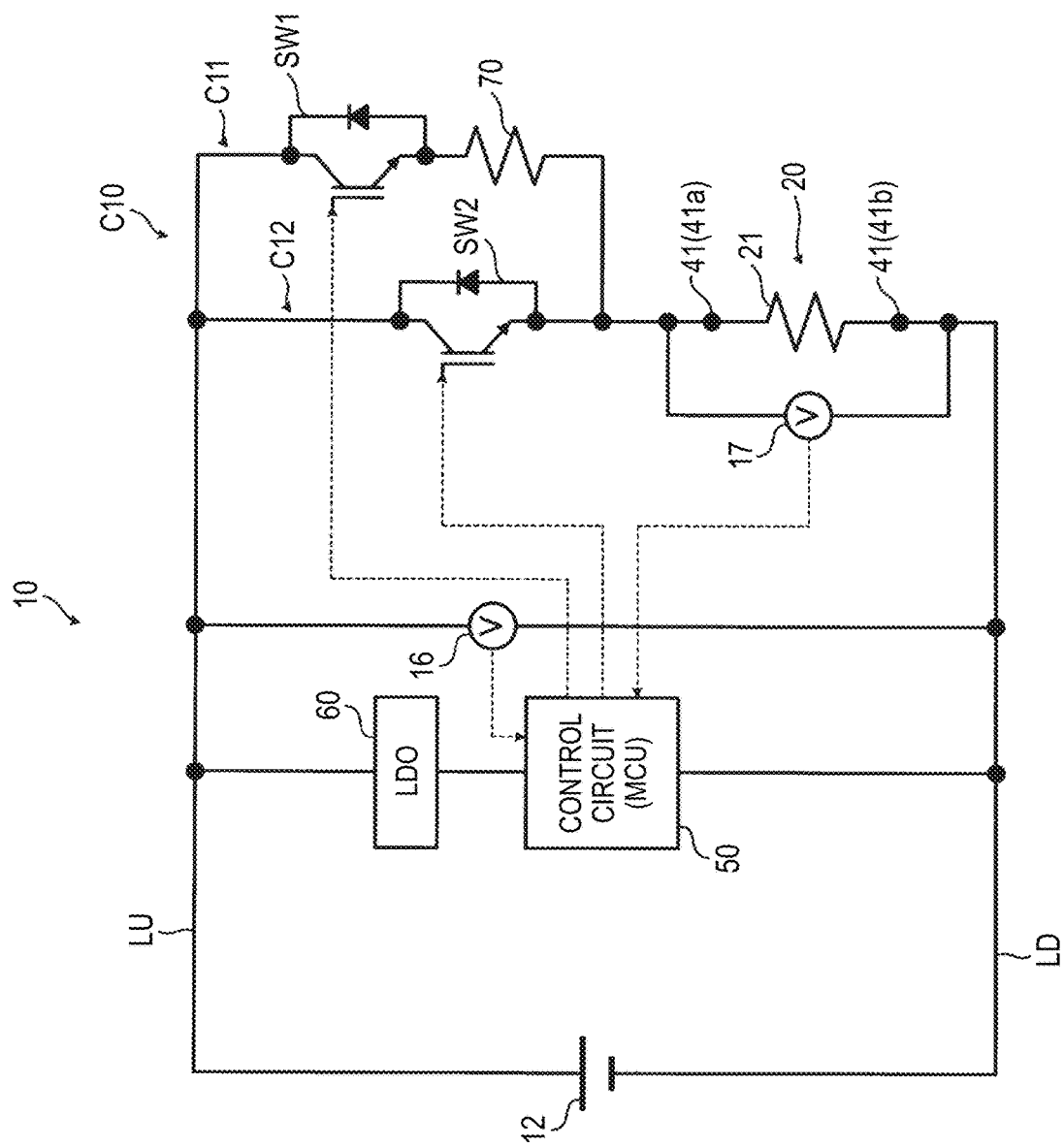
FIG. 6 illustrates a main circuit configuration of the power supply unit.

As illustrated in FIG. 6, the power supply unit 10 includes: the power supply 12; the control circuit 50; a low drop out (LDO) regulator 60; a shunt resistor 70; a first switch SW1; a second switch SW2; the discharge terminal 41 connected to the load 21; and the load voltage sensor 17. The shunt resistor 70, the first switch SW1, the second switch SW2, the discharge terminal 41 connected to the load 21 and the load voltage sensor 17 constitute a heating and measurement circuit C10 to be described below.

In the power supply unit 10, the control circuit 50 is connected in series with the LDO regulator 60. The control circuit 50 and the LDO regulator 60 which are connected in series are connected to a main positive bus LU which is connected to a positive terminal of the power supply 12 and a main negative bus LD which is connected to a negative terminal of the power supply 12. Specifically, the control circuit 50 and the LDO regulator 60 are connected to the main positive bus LU and the main negative bus LD in a state where the LDO regulator 60 is on the side of the main positive bus LU while the control circuit 50 is on the side of the main negative bus LD.

The LDO regulator 60 is a voltage converter that converts a voltage applied by the power supply 12 (for example, 4.2 [V]) into a predetermined constant voltage (for example, 3.7 [V]). The LDO regulator 60 outputs the converted voltage to the control circuit 50.

The circuit voltage sensor 16 is connected in parallel to the control circuit 50 and the LDO regulator 60 which are connected in series and the heating and measurement circuit C10 to be described below, and has one end connected to the main positive bus LU while the other end connected to the main negative bus LD. As a result, the circuit voltage sensor 16 can detect a voltage between the main positive bus LU and the main negative bus LD. Moreover, the circuit voltage sensor 16 is also connected to the control circuit 50, and sends information indicating the detected voltage to the control circuit 50. As a result, the circuit voltage sensor 16 can notify the control circuit 50 of the detected voltage. Hereinafter, the voltage detected by the circuit voltage sensor 16 is also referred to as a "circuit voltage".

The heating and measurement circuit C10 includes: a first circuit C11 which includes the first switch SW1 and the shunt resistor 70; a second circuit C12 which includes the second switch SW2, the discharge terminal 41 connected to the load 21, and the load voltage sensor 17. In the heating and measurement circuit C10, the first circuit C11 and the second circuit C12 are connected in parallel, and the first circuit C11 and the second circuit C12, which are connected in parallel, are connected in series to the load 21 and the discharge terminal 41 connected to two ends of the load 21.

The first switch SW1 and the second switch SW2 are switches which are connected to the control circuit 50 and are opened and closed under control of the control circuit 50. The first switch SW1 and the second switch SW2 are, for example, MOSFETs. In this case, the control circuit 50 can control the opening and closing of the first switch SW1 and the second switch SW2 and an amount of currents flowing therethrough by controlling gate voltages of the first switch SW1 and the second switch SW2.

The shunt resistor 70 is a resistor having a predetermined electric resistance value. The electric resistance value of the shunt resistor 70 is hereinafter referred to as an electric resistance value $R_S$. Details of the electric resistance value $R_S$ will be described below. As illustrated in FIG. 6, the shunt resistor 70 is connected in series to the first switch SW1 in the first circuit C11 and is provided downstream of the first switch SW1 (on the side of the discharge terminal 41). The shunt resistor 70 may also be provided upstream of the first switch SW1 in the first circuit C11.

For example, when the first cartridge 20 is attached to the power supply unit 10, the two ends of the load 21 are connected to the discharge terminal 41 as illustrated in FIG. 6. The load voltage sensor 17 is connected in parallel with the load 21 (that is, the discharge terminal 41) in the heating and measurement circuit C10 to detect a voltage applied to the load 21. The voltage applied to the load 21 is an inter-terminal voltage between a positive electrode side discharge terminal 41a of the discharge terminal 41 and a negative electrode side discharge terminal 41b of the discharge terminal 41.

The load voltage sensor 17 is also connected to the control circuit 50, and sends information indicating the detected voltage to the control circuit 50. As a result, the load voltage sensor 17 can notify the control circuit 50 of the detected voltage. Hereinafter, the voltage detected by the load voltage sensor 17, that is, the voltage applied to the load 21 is also referred to as a "load voltage".

According to the power supply unit 10 illustrated in FIG. 6, in a case where the load 21 is connected to the discharge terminal 41, when the control circuit 50 turns on the first switch SW1 and turns off the second switch SW2, a current flows through the load 21 via the first circuit C11. Therefore, in this case, the control circuit 50 can acquire the electric resistance value $R_H$ and a temperature T of the load 21 based on the detected circuit voltage and load voltage and the electric resistance value $R_S$ of the shunt resistor 70, as will be described below.

On the other hand, in the case where the load 21 is connected to the discharge terminal 41, when the control circuit 50 turns on the second switch SW2 and turns off the first switch SW1, a current flows through the load 21 via the second circuit C12. Therefore, in this case, the control circuit 50 can prevent the voltage applied to the load 21 from being decreased by the shunt resistor 70, thereby efficiently heating the load 21.

(Configuration of Control Device)

Next, a configuration of the control circuit 50 will be described in more detail.

As illustrated in FIG. 5, the control circuit 50 includes an aerosol generation request detector 51, a load state acquisition unit 52, a power controller 53, and a notification controller 54 as functional blocks realized by a processor executing a program stored in a ROM.

The aerosol generation request detector 51 detects an aerosol generation request based on an output result of the intake sensor 15. The intake sensor 15 is configured to output a value of a pressure (internal pressure) change in the power supply unit 10 caused by inhale of the user through the inhale opening 32. The intake sensor 15 is, for example, a pressure sensor that outputs an output value (for example, a voltage value or a current value) corresponding to an internal pressure that changes in accordance with a flow rate of air inhaled from the intake opening (not illustrated) toward the inhale opening 32 (that is, the puff operation of the user). The intake sensor 15 may be constituted by a condenser microphone or the like.

The load state acquisition unit 52 acquires the temperature T of the load 21 based on the electric resistance value $R_S$ of the shunt resistor 70, the circuit voltage detected by the circuit voltage sensor 16, and the load voltage detected by the load voltage sensor 17. Hereinafter, a specific example of the temperature T acquired by the load state acquisition unit 52 will be described.

Here, the circuit voltage is referred to as V, the load voltage is referred to as $V_H$, and the current input to the heating and measurement circuit C10 is referred to as I. As described above, the electric resistance value of the load 21 is $R_H$ and the electric resistance value of the shunt resistor 70 is $R_S$.

The circuit voltage V in a case where the first switch SW1 is on while the second switch SW2 is off (that is, when the current flows through the load 21 via the first circuit C11)

can be expressed by the following formula (F2). Moreover, the load voltage $V_H$ in this case can be expressed by the following formula (F3).

[Formula 2]

$$V = I \cdot (R_S + R_H) \quad (F2)$$

[Formula 3]

$$V_H = I \cdot R_H \quad (F3)$$

By substituting the above formula (F3) into the above formula (F2) and modifying the formula, the following formula (F4) can be obtained.

[Formula 4]

$$R_H = \frac{V_H}{V - V_H} \cdot R_S \quad (F4)$$

Based on the circuit voltage V, the load voltage $V_H$, and the electric resistance value $R_S$ of the shunt resistor 70, the load state acquisition unit 52 can obtain the electric resistance value $R_H$ of the load 21 by the above formula (F4). As represented in the above formula (F1), the electric resistance value $R_H$ and the temperature T of the load 21 are correlated. Therefore, the load state acquisition unit 52 can obtain the temperature T of the load 21 from the acquired electric resistance value $R_H$ of the load 21 and the above formula (F1).

The notification controller 54 controls the notification unit 45 to notify various types of information. For example, the notification controller 54 controls the notification unit 45 to notify replacement timing of the second cartridge 30 in response to detection of the replacement timing of the second cartridge 30. The notification controller 54 detects and notifies the replacement timing of the second cartridge 30 based on the cumulative number of times of puff operations or a cumulative energization time to the load 21 stored in the memory 18. The notification controller 54 is not limited to only notify the replacement timing of the second cartridge 30, and may also notify replacement timing of the first cartridge 20, replacement timing of the power supply 12, charging timing of the power supply 12 and the like.

The notification controller 54 determines that the second cartridge 30 has been used up (for example, a remaining amount is zero or empty), and notifies the replacement timing of the second cartridge 30 in a case where one unused second cartridge 30 is set and then the puff operation is performed a predetermined number of times or in a case where the cumulative energization time to the load 21 reaches a predetermined value (for example, 120 seconds) due to the puff operation.

The notification controller 54 may determine that one first cartridge 20 included in one set has been used up (for example, the remaining amount is zero or empty), and notifies the replacement timing of the first cartridge 20 in a case where it is determined that all the second cartridges 30 included in the above one set have been used up.

When the aerosol generation request detector 51 detects the aerosol generation request, the power controller 53 controls discharge of the power supply 12 via the discharge terminal 41 by, for example, on/off of the first switch SW1.

The power controller 53 performs control such that an amount of aerosol generated by atomizing the aerosol source by the load 21 falls within a desired range, in other words, an amount of power supplied from the power supply 12 to the load 21 falls within a certain range. Specifically, the power controller 53 controls the on/off of the first switch SW1 by, for example, pulse width modulation (PWM) control. Instead of the PWM control, the power controller 53 may also control the on/off of the first switch SW1 by pulse frequency modulation (PFM) control.

The power controller 53 may stop power supply from the power supply 12 to the load 21 when a predetermined period of time has elapsed since the power supply to the load 21 was started. In other words, the power controller 53 stops the power supply from the power supply 12 to the load 21 when a puff period exceeds a predetermined period even within the puff period when the user actually performs the puff operation. The predetermined period is set in order to reduce variations in the puff period of the user. The power controller 53 controls a duty ratio of on/off of the switch 19 during one puff operation in accordance with an amount of electricity stored in the power supply 12. For example, the power controller 53 controls an on-time interval (pulse interval) for supplying power from the power supply 12 to the load 21, and controls an on-time length (pulse width) for supplying power from the power supply 12 to the load 21.

The power controller 53 detects electric connection between the charge terminal 43 and the external power supply 60, and controls charging of the power supply 12 via the charger 13.

(Temperature Resolution of Load Detectable by Control Device)

Next, resolution of the temperature T of the load 21 that can be detected (acquired) by the control circuit 50 will be considered. Hereinafter, the resolution of the temperature T of the load 21 that can be detected by the control circuit 50 is also referred to as "temperature resolution".

(Specific Configuration for Acquiring Load Temperature and the Like)

Figure 8:
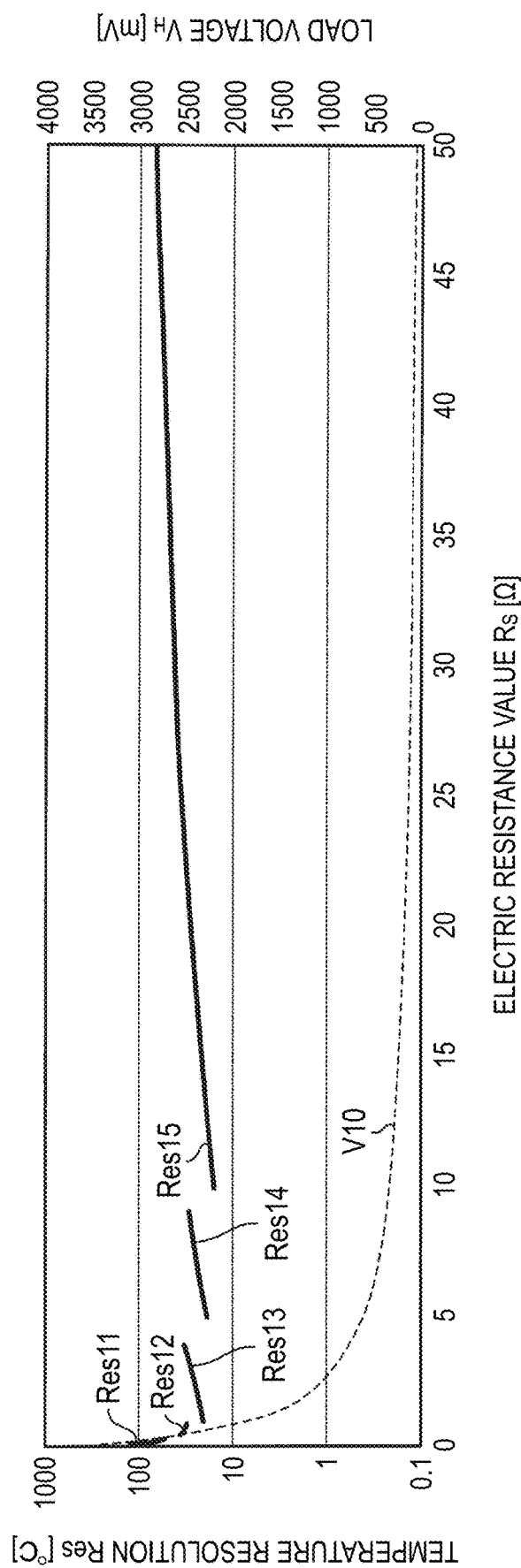
FIG. 8 illustrates a first example of a relationship between a reference voltage, a temperature resolution, and an electric resistance value of a shunt resistor.

FIG. 8 is a main part enlarged view of a circuit configuration of the power supply unit 10 illustrated in FIG. 6. As illustrated in FIG. 8, the control circuit 50 includes: the operational amplifier 56; the analog-digital converter (ADC) 57; and the processor 55. The operational amplifier 56 and the analog-digital converter 57 may also be provided outside the control circuit 50.

The operational amplifier 56 includes: a non-inverting input terminal (+) 56a; an inverting input terminal (−) 56b; an output terminal 56c; and a pair of power supply terminals. The operational amplifier 56 amplifies a difference value obtained by subtracting a voltage input to the inverting input terminal 56b from a voltage input to the non-inverting input terminal 56a by a predetermined amplification factor (hereinafter referred to as "amplification factor A"), and outputs the amplified voltage from the output terminal 56c to the analog-digital converter 57.

Specifically, the non-inverting input terminal 56a of the operational amplifier 56 is connected to the load voltage sensor 17. As a result, a voltage signal (analog signal) indicating output of the load voltage sensor 17, that is, the load voltage $V_H$, is applied to the non-inverting input terminal 56a as an input voltage $V_{IN}$. The input voltage $V_{IN}$ varies in accordance with a change in the electric resistance value $R_H$ of the load 21. Therefore, an amount of change in the input voltage $V_{IN}$ with respect to an amount of change in the electric resistance value $R_H$ of the load 21 is hereinafter referred to as $\Delta V_{IN}$.

The inverting input terminal 56b of the operational amplifier 56 is connected to, for example, ground G1, and the voltage input to the inverting input terminal 56b is "0

Figure 7:
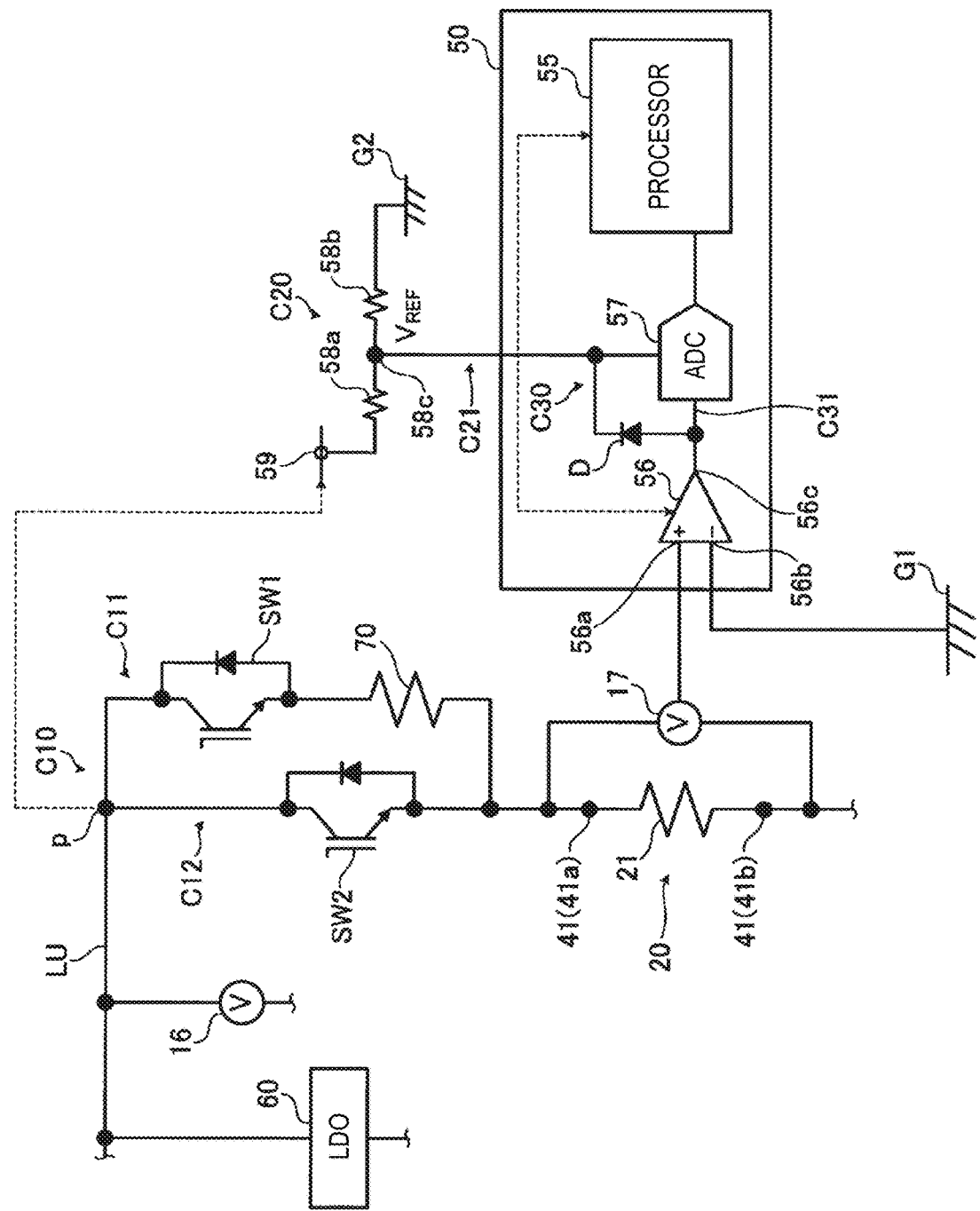
FIG. 7 is a main part enlarged view of a circuit configuration of the power supply unit of FIG. 6.

(zero)". Therefore, a voltage signal $A \cdot V_{IN}$ (analog signal) obtained by amplifying the input voltage $V_{IN}$ by the amplification factor A is output from the output terminal 56c of the operational amplifier 56, and is input to the analog-digital converter 57. Moreover, the pair of power supply terminals of the operational amplifier 56 includes a high potential side power supply terminal and a low potential side power supply terminal. The reference voltage $V_{REF}$ is input to the high potential side power supply terminal, for example. The low potential side power supply terminal is connected to ground G (not illustrated), for example. The ground G may be common with the ground G1. As illustrated in FIG. 7, the reference voltage $V_{REF}$ is also input to the processor 55 as a power supply voltage of the processor 55, for example.

A voltage decreased to the reference voltage $V_{REF}$ by a step-down circuit C20 included in the power supply unit 10 is input to the analog-digital converter 57 as the power supply voltage. Specifically, as illustrated in FIG. 7, the step-down circuit C20 includes: a first resistor 58a and a second resistor 58b each having a predetermined electric resistance value; an input terminal 59; and ground G2. The ground G1 and the ground G2 may be common.

In the step-down circuit C20, the first resistor 58a and the second resistor 58b are connected in series. One end, which is located on the side of the first resistor 58a, of the first resistor 58a and the second resistor 58b which are connected in series is connected to the input terminal 59, while the other end which is located on the side of the second resistor 58b is connected to the ground G2.

The input terminal 59 receives a voltage input to the step-down circuit C20. For example, the input terminal 59 is connected to a node p provided between the LDO regulator 60 and the first circuit C11 in the main positive bus LU. The node p is connected in series to the LDO regulator 60, and a voltage applied to the main positive bus LU is input to the step-down circuit C20 via the input terminal 59. The voltage (3.7 [V], for example) output from the LDO regulator 60 may be input to the step-down circuit C20.

A branch portion 58c is provided between the first resistor 58a and the second resistor 58b which are connected in series. An input circuit C21 that connects the step-down circuit C20 and the analog-digital converter 57 is branched from the branch portion 58c.

In this way, the step-down circuit C20 decreases a voltage input to the step-down circuit C20 to the reference voltage $V_{REF}$, and inputs the reference voltage $V_{REF}$ to the analog-digital converter 57 via the input circuit C21. According to such a step-down circuit C20, the desired reference voltage $V_{REF}$ can be obtained with a simple configuration by appropriately selecting the electric resistance values of the first resistor 58a and the second resistor 58b.

The control circuit 50 may further include a clamp circuit C30. The clamp circuit C30 is connected to a circuit C31 configured to input a voltage signal to the analog-digital converter 57 and the input circuit C21 configured to input the reference voltage $V_{REF}$ to the analog-digital converter 57. The clamp circuit C30 includes, for example, a diode D capable of passing a current only from the side of the circuit C31 to the side of the input circuit C21.

By providing such a clamp circuit C30, for example, even when the voltage signal input to the analog-digital converter 57 fluctuates, the voltage signal can be maintained at or below the voltage value of the reference voltage $V_{REF}$. Specifically, when the voltage signal input to the analog-digital converter 57 can be higher than the reference voltage $V_{REF}$, the circuit C31 and the input circuit C21 become conductive via the clamp circuit C30, so that the voltage signal becomes a potential equal to the reference voltage $V_{REF}$. In particular, as illustrated in FIG. 7, by providing the clamp circuit C30 on a downstream side of the operational amplifier 56 in the circuit C31, even if the voltage signal input to the analog-digital converter 57 is amplified by the operational amplifier 56, the voltage signal can be maintained at or below the voltage value of the reference voltage.

The analog-digital converter 57 operates through using the reference voltage $V_{REF}$ input from the step-down circuit C20 as a power supply voltage, converts the voltage signal $A \cdot V_{IN}$ input from the operational amplifier 56 into a digital signal, and outputs the converted digital signal to the processor 55. An analog-digital converter which has an N-bit resolution that operates according to the reference voltage $V_{REF}$ is used as the analog-digital converter 57.

Here, a resolution Res [V/bit] of the N-bit analog-digital converter 57 to which the reference voltage $V_{REF}$ is input as the power supply can be expressed by the following formula (F5).

[Formula 5]

$$Res[V/\text{bit}] = \frac{V_{REF}}{2^N} \quad (F5)$$

When the formula (F5) is rewritten such that a dimension of the resolution Res changes from [V/bit] to [° C.], the temperature resolution Res [° C.] of the control circuit 50 with respect to the temperature T of the load 21 can be expressed by the following formula (F6).

[Formula 6]

$$Res[° C.] = \frac{\Delta T_H(\Delta R_H) \cdot Res[V/\text{bit}]}{\Delta V_{IN}} \quad (F6)$$

$\Delta T_H$ ($\Delta R_H$) in the above formula (F6) represents an amount of change in the temperature T of the load 21 in accordance with an amount of change in the electric resistance value $R_H$ of the load 21. Therefore, by using the resistance temperature coefficient α [%] of the load 21, the above formula (F6) can be transformed into the following formula (F7). In the following formula (F7), $I_H$ refers to a current value of the current flowing through the load 21.

[Formula 7]

$$\begin{aligned} Res[° C.] &= \frac{1}{\alpha[\%]} \cdot \frac{1}{\Delta V_{IN}} \cdot Res[V/\text{bit}] \\ &= \frac{1}{\alpha[ppm/° C.] \times 10^2 \times 10^{-6}} \cdot \frac{1}{\Delta V_{IN}} \cdot Res[V/\text{bit}] \\ &= \frac{1}{\alpha[ppm/° C.] \times 10^{-4}} \cdot \frac{1}{\Delta V_{IN}} \cdot \frac{V_{REF}}{2^N} \\ &= \frac{1}{\alpha[ppm/° C.] \times 10^{-4}} \cdot \frac{1}{A \cdot I_H \cdot \Delta R_H} \cdot \frac{V_{REF}}{2^N} \end{aligned} \quad (F7)$$

As a result of the study, it was found that if the resolution of the temperature T of the load 21 is 10 [° C.] or less, most of the control performed by the control circuit 50 in the aerosol inhaler 1 can be performed with a certain degree of accuracy. Therefore, the temperature resolution Res [° C.]≤10 [° C.] expressed by the above formula (F7) is realized in the power supply unit 10 such that the temperature T of the load 21 can be acquired with a certain degree of accuracy ensured. Specifically, the temperature resolution Res [° C.]≤10 [° C.] is realized by performing at least one of the following: (1) optimization of the resistance temperature coefficient α of the load 21; (2) optimization of the reference voltage $V_{REF}$; and (3) optimization of the amplification factor A of the operational amplifier 56, as will be described below.

(Optimization of Resistance Temperature Coefficient)

First, the optimization of the resistance temperature coefficient α of the load 21 will be considered.

It can be seen from the above formula (F7) that the temperature resolution Res [° C.] can be reduced when the resistance temperature coefficient α of the load 21 is increased.

The resistance temperature coefficient α of the load 21 depends on a material or the like of the load 21. For example, when the load 21 is formed of nichrome, the resistance temperature coefficient α can be set to about 100 [ppm/° C.]. Moreover, even when the load 21 is formed of nichrome, the resistance temperature coefficient α of the load 21 can be set to about 200 [ppm/° C.] by appropriately adjusting a content of nickel or chromium or a diameter of an electric heating wire included in the load 21, and the like. When the load 21 is formed of stainless steel, the resistance temperature coefficient α can be set to about 1000 [ppm/° C.]. When the load 21 is formed of tungsten, the resistance temperature coefficient α can be set to about 4000 [ppm/° C.].

Therefore, from the viewpoint of minimizing the temperature resolution Res [° C.], it is most preferable to use tungsten among the three materials described above to form the load 21, and then stainless steel is preferably used to form the load 21. Meanwhile, although the resistance temperature coefficient α of the nichrome is small as compared with tungsten or stainless steel, nichrome is inexpensive and has an advantage of being easy to handle due to the small resistance temperature coefficient α thereof. That is, when nichrome is used, there is little change in the electric resistance value at room temperature and at a temperature when the aerosol source 22 is heated to generate the aerosol (for example, 200 [° C.]), so it is possible to generate the aerosol with high efficiency.

Therefore, it is desirable to select the material of the load 21 (that is, the resistance temperature coefficient α of the load 21) so as to obtain a desired level of temperature resolution Res [° C.] in combination with the optimization of the reference voltage $V_{REF}$ and the amplification factor A of the operational amplifier 56 to be described below.

(Optimization of Reference Voltage)

Next, the optimization of the reference voltage $V_{REF}$ will be considered.

It can be seen from the above formula (F7) that the temperature resolution Res [° C.] can be reduced when the reference voltage $V_{REF}$ is reduced. Therefore, it is considered to minimize the reference voltage $V_{REF}$ during the optimization of the reference voltage $V_{REF}$. Hereinafter, a specific example of the optimization of the reference voltage $V_{REF}$ will be described with reference to FIG. 7.

In order to appropriately operate the analog-digital converter 57 of the control circuit 50, the reference voltage $V_{REF}$, which is the power supply voltage of the analog-digital converter 57, needs to be equal to or higher than a voltage value of the voltage signal $A \cdot V_{IN}$ input from the operational amplifier 56 to the analog-digital converter 57. In other words, if the voltage value of the voltage signal $A \cdot V_{IN}$ from the operational amplifier 56 can be lowered, the analog-digital converter 57 can be appropriately operated even if the reference voltage $V_{REF}$ is lowered accordingly.

(Reduction of Voltage Value of Voltage Signal from Operational Amplifier)

As one method of lowering the voltage value of the voltage signal $A \cdot V_{IN}$ from the operational amplifier 56, it is conceivable to set the amplification factor A to 1 such that the operational amplifier 56 does not amplify the input voltage $V_{IN}$. As a result, the voltage signal input from the operational amplifier 56 to the analog-digital converter 57 can be set to $1 \cdot V_{IN} = V_{IN}$. It should be noted that when the inverting input terminal 56b of the operational amplifier 56 is connected to a potential higher than the ground G1, the output of the load voltage sensor 17 which is input to the non-inverting input terminal 56a becomes smaller than that in a case where the inverting input terminal 56b is connected to the ground G1, and is output from the output terminal 56c. Moreover, it should be noted that when the inverting input terminal 56b of the operational amplifier 56 is connected to a potential lower than the ground G1, the output of the load voltage sensor 17 which is input to the non-inverting input terminal 56a becomes greater than that in the case where the inverting input terminal 56b is connected to the ground G1 and is output from the output terminal 56c, which is not the amplification that the operational amplifier 56 originally performs.

It should be noted that the output from the load voltage sensor 17 may be directly input to the analog-digital converter 57 without providing the operational amplifier 56, and the voltage signal input to the analog-digital converter 57 can be $V_{IN}$ even with such a configuration.

Further, as another method of lowering the voltage value of the voltage signal $A \cdot V_{IN}$ from the operational amplifier 56, it is conceivable to reduce the input voltage $V_{IN}$ input to the operational amplifier 56. As described above, the input voltage $V_{IN}$ is a voltage signal indicating the output of the load voltage sensor 17, that is, the load voltage $V_H$. Therefore, by lowering the load voltage $V_H$, the input voltage $V_{IN}$ can also be lowered.

When the control circuit 50 acquires the temperature T of the load 21, the first switch SW1 is on, the second switch SW2 is off, and a current flows through the load 21 via the first circuit C11. That is, in this case, the current flows through the load 21 via the shunt resistor 70. Therefore, a voltage input to the heating and measurement circuit C10 drops in accordance with the electric resistance value $R_S$ of the shunt resistor 70, and is applied to the load 21.

Therefore, if the electric resistance value $R_S$ of the shunt resistor 70 is increased, an amount of voltage drop corresponding to the electric resistance value $R_S$ can be increased accordingly, so that the load voltage $V_H$ applied to the load 21, that is, the input voltage $V_{IN}$ can be lowered. However, in order to prevent an accuracy decrease of the temperature T caused by an influence of the Seebeck effect or the like, it is desirable to secure the load voltage $V_H$ at about 50 [mV].

(Electric Resistance Value of Shunt Resistor)

In addition to the viewpoint of lowering the load voltage VH, the electric resistance value $R_S$ of the shunt resistor 70 is preferably 10 [Ω] or more such that a resistor used as the shunt resistor 70 is easily and inexpensively procured. In general, shunt resistors having electric resistance values of less than 10 [Ω] have limited types and suppliers, so that a cost thereof is increased, and mass procurement is likely to be difficult. Further, in view of preventing the accuracy decrease of the temperature T caused by Joule heat generated by the shunt resistor 70, the electric resistance value $R_S$ of the shunt resistor 70 is ideally 25 [Ω] or more.

The electric resistance value $R_S$ of the shunt resistor 70 may also be selected in consideration of rated power of the shunt resistor 70. Specifically, it is preferable to select the electric resistance value $R_S$ of the shunt resistor 70 such that power consumption of the shunt resistor 70 when power is supplied to the first circuit C11 is equal to or lower than the rated power of the shunt resistor 70.

Here, when the voltage applied to the shunt resistor 70 is referred to as Vs, as described above, the circuit voltage is referred to as V, the electric resistance value of the load 21 is referred to as $R_H$, the electric resistance value of the shunt resistor 70 is referred to as RS, and the current input to the heating and measurement circuit C10 is referred to as I, power consumption $P_S$ [W] of the shunt resistor 70 can be expressed by the following formula (F8).

[Formula 8]

$$P_s[W] = I \cdot V_s \\ = I^2 \cdot R_s \\ = \left(\frac{V}{R_H + R_s}\right)^2 \cdot R_s \quad (F8)$$

By selecting the electric resistance value $R_S$ of the shunt resistor 70 such that the power consumption $P_S$ [W] of the shunt resistor 70 expressed by the above formula (F8) is equal to or lower than the rated power of the shunt resistor 70, heat generation and breakage of the shunt resistor 70 can be prevented when a current is supplied to the shunt resistor 70 to acquire the temperature T of the load 21.

As described above, the voltage value of the voltage signal $A \cdot V_{IN}$ input from the operational amplifier 56 to the analog-digital converter 57 can be reduced by setting the amplification factor A of the operational amplifier 56 to 1 (or not providing the operational amplifier 56) and increasing the electric resistance value $R_S$ of the shunt resistor 70. By appropriately selecting electric resistance values of the first resistor 58a and the second resistor 58b of the step-down circuit C20 such that a voltage value larger than the voltage value of the voltage signal $A \cdot V_{IN}$ can be obtained, the reference voltage $V_{REF}$ can be lowered and the temperature resolution Res [° C.] can be reduced.

(Specific Relationship Between Reference Voltage, Temperature Resolution and Electric Resistance Value of Shunt Resistor)

Next, a specific relationship between the reference voltage $V_{REF}$, the temperature resolution Res [° C.], and the electric resistance value $R_S$ of the shunt resistor 70 will be described.

FIG. 8 illustrates a first example of the relationship between the reference voltage $V_{REF}$, the temperature resolution Res [° C.], and the electric resistance value $R_S$ of the shunt resistor 70. In the first example, the resistance temperature coefficient α of the load 21 is 100 [ppm/° C.], the amplification factor A of the operational amplifier 56 is 1, the amount of change $\Delta R_H$ of the electric resistance value $R_H$ of the load 21 is 1 [%], and N is 10 [bit]. As described above, the resistance temperature coefficient α=100 [ppm/° C.] can be realized by forming the load 21 by nichrome. In FIG. 8, a horizontal axis indicates the electric resistance value $R_S$ [Ω] of the shunt resistor 70, a vertical axis on a left side indicates the temperature resolution Res [° C.], and a vertical axis on a right side indicates the load voltage $V_H$ [mV].

In FIG. 8, a temperature resolution Res 11 indicates a relationship between the temperature resolution Res [° C.] and the electric resistance value $R_S$ when the reference voltage $V_{REF}$ is 3.7 [V]. A temperature resolution Res 12 indicates the relationship between the temperature resolution Res [° C.] and the electric resistance value $R_S$ when the reference voltage $V_{REF}$ is 3.0 [V].

In FIG. 8, a temperature resolution Res 13 indicates the relationship between the temperature resolution Res [° C.] and the electric resistance value $R_S$ when the reference voltage $V_{REF}$ is 2.0 [V]. A temperature resolution Res 14 indicates the relationship between the temperature resolution Res [° C.] and the electric resistance value $R_S$ when the reference voltage $V_{REF}$ is 1.0 [V].

In FIG. 8, a temperature resolution Res 15 indicates the relationship between the temperature resolution Res [° C.] and the electric resistance value $R_S$ when the reference voltage $V_{REF}$ is 0.5 [V]. As illustrated in the temperature resolution Res 11 to the temperature resolution Res 15, the load voltage $V_H$ [mV] is shown in a case where the reference voltage $V_{REF}$ is lowered from 3.7 [V] to 0.5 [V] and the electric resistance value $R_S$ is increased from 0 [Ω] to 50 [Ω].

In the case of the first example illustrated in FIG. 8, that is, when the resistance temperature coefficient α of the load 21 is 100 [ppm/° C.] and the amplification factor A of the operational amplifier 56 is 1, it is difficult to realize the temperature resolution Res [° C.]≤10 [° C.] even if the reference voltage $V_{REF}$ and the electric resistance value $R_S$ of the shunt resistor 70 are adjusted.

Figure 9:
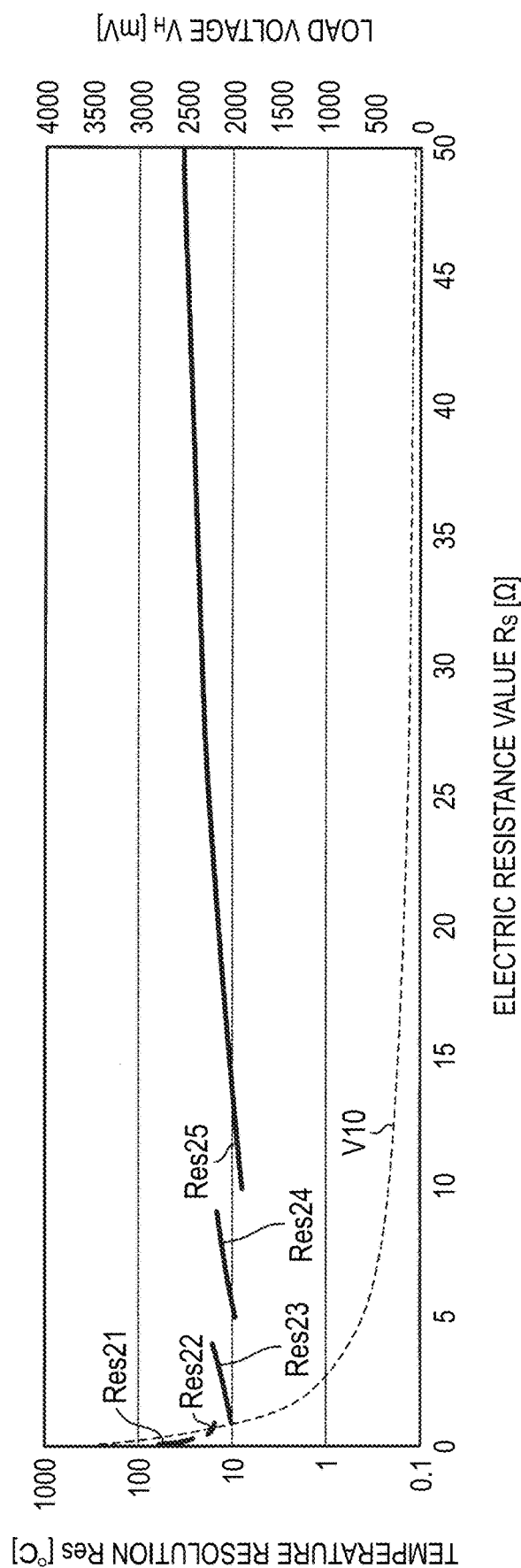
FIG. 9 illustrates a second example of the relationship between the reference voltage, the temperature resolution, and the electric resistance value of the shunt resistor.

FIG. 9 illustrates a second example of the relationship between the reference voltage $V_{REF}$, the temperature resolution Res [° C.], and the electric resistance value $R_S$ of the shunt resistor 70. In the second example, the resistance temperature coefficient α of the load 21 is 200 [ppm/° C.], which is different from the first example illustrated in FIG. 8. Therefore, in the following description of FIG. 9, descriptions of the same points as those in the first example illustrated in FIG. 8 will be omitted as appropriate. As described above, the resistance temperature coefficient α=200 [ppm/° C.] can be realized by forming the load 21 by nichrome.

In FIG. 9, a temperature resolution Res 21 indicates the relationship between the temperature resolution Res [° C.] and the electric resistance value $R_S$ when the reference voltage $V_{REF}$ is 3.7 [V]. A temperature resolution Res 22 indicates the relationship between the temperature resolution Res [° C.] and the electric resistance value $R_S$ when the reference voltage $V_{REF}$ is 3.0 [V].

In FIG. 9, a temperature resolution Res 23 indicates the relationship between the temperature resolution Res [° C.] and the electric resistance value $R_S$ when the reference voltage $V_{REF}$ is 2.0 [V]. A temperature resolution Res 24 indicates the relationship between the temperature resolution Res [° C.] and the electric resistance value $R_S$ when the reference voltage $V_{REF}$ is 1.0 [V].

In FIG. 9, a temperature resolution Res 25 indicates the relationship between the temperature resolution Res [° C.] and the electric resistance value $R_S$ when the reference voltage $V_{REF}$ is 0.5 [V].

In the case of the second example illustrated in FIG. 9, that is, when the resistance temperature coefficient α of the load 21 is 200 [ppm/° C.] and the amplification factor A of the operational amplifier 56 is 1, the temperature resolution Res [° C.]≤10 [° C.] can be realized when the reference voltage $V_{REF}$ is 0.5 [V] and the electric resistance value $R_S$ is about 10 [Ω]. It should be noted that the temperature resolution Res [° C.] does not become equal to or less than 5 [° C.] in the case of the second example illustrated in FIG. 9.

Figure 10:
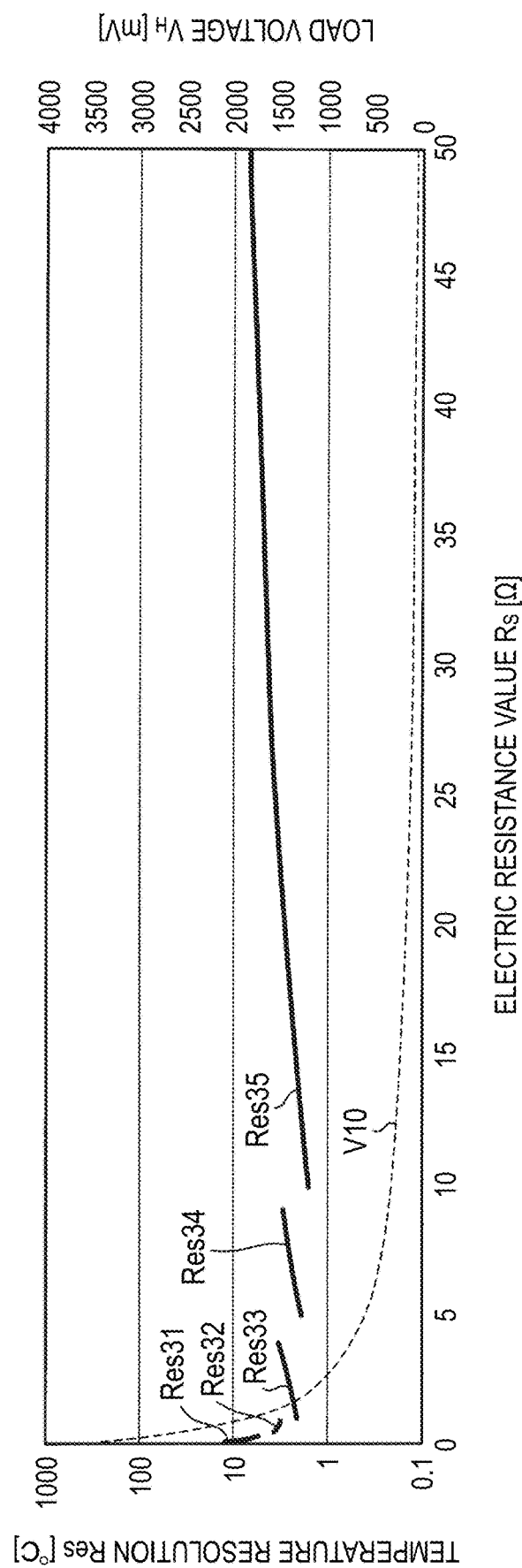
FIG. 10 illustrates a third example of the relationship between the reference voltage, the temperature resolution, and the electric resistance value of the shunt resistor.

FIG. 10 illustrates a third example of the relationship between the reference voltage $V_{REF}$, the temperature resolution Res [° C.], and the electric resistance value $R_S$ of the shunt resistor 70. In the third example, the resistance temperature coefficient α of the load 21 is 1000 [ppm/° C.], which is different from the first example illustrated in FIG. 8. Therefore, in the following description of FIG. 10, descriptions of the same points as those in the first example illustrated in FIG. 8 will be omitted as appropriate. As described above, the resistance temperature coefficient α=1000 [ppm/° C.] can be realized by forming the load 21 by stainless steel.

In FIG. 10, a temperature resolution Res 31 indicates the relationship between the temperature resolution Res [° C.] and the electric resistance value $R_S$ when the reference voltage $V_{REF}$ is 3.7 [V]. A temperature resolution Res 32 indicates the relationship between the temperature resolution Res [° C.] and the electric resistance value $R_S$ when the reference voltage $V_{REF}$ is 3.0 [V].

In FIG. 10, a temperature resolution Res 33 indicates the relationship between the temperature resolution Res [° C.] and the electric resistance value $R_S$ when the reference voltage $V_{REF}$ is 2.0 [V]. A temperature resolution Res 34 indicates the relationship between the temperature resolution Res [° C.] and the electric resistance value $R_S$ when the reference voltage $V_{REF}$ is 1.0 [V].

In FIG. 10, a temperature resolution Res 35 indicates the relationship between the temperature resolution Res [° C.] and the electric resistance value $R_S$ when the reference voltage $V_{REF}$ is 0.5 [V].

In the case of the third example illustrated in FIG. 10, that is, when the resistance temperature coefficient α of the load 21 is 1000 [ppm/° C.] and the amplification factor A of the operational amplifier 56 is 1, the temperature resolution Res [° C.]≤10 [° C.] can be realized except when the reference voltage $V_{REF}$ is 3.7 [V] and the electric resistance value $R_S$ is around 0 [Ω] (provided that the electric resistance value $R_S$≤50 [Ω]). It should be noted that the temperature resolution Res [° C.] does not become equal to or less than 1 [° C.] in the case of the third example illustrated in FIG. 10.

Figure 11:
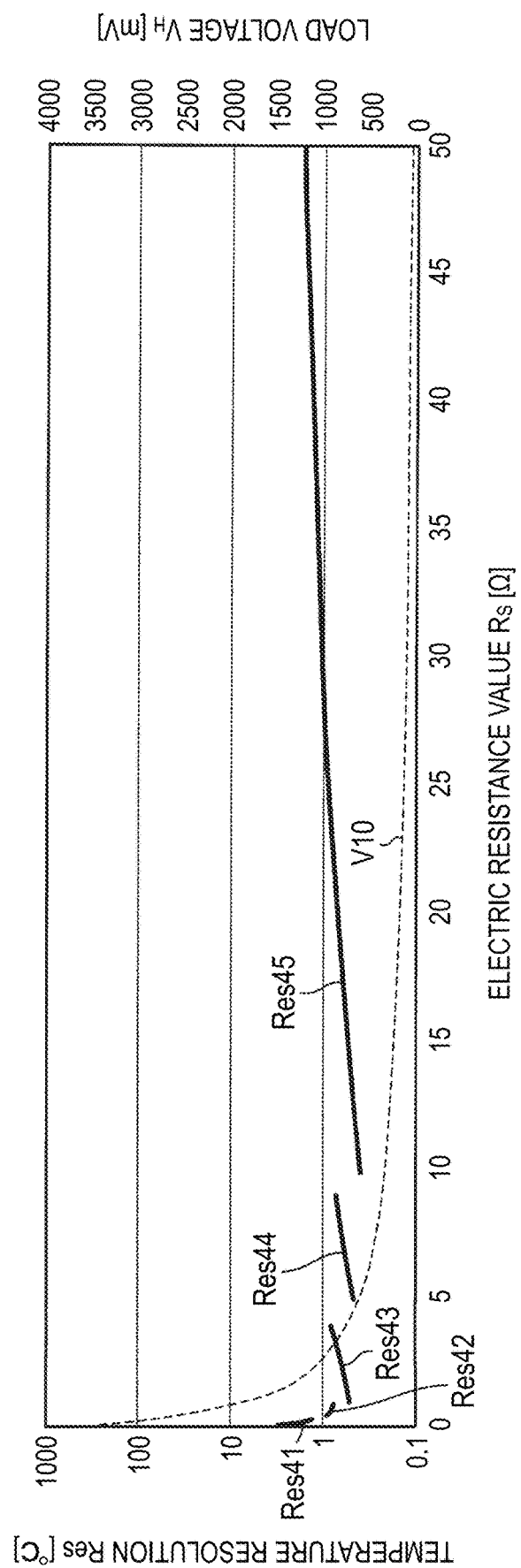
FIG. 11 illustrates a fourth example of the relationship between the reference voltage, the temperature resolution, and the electric resistance value of the shunt resistor.

FIG. 11 illustrates a fourth example of the relationship between the reference voltage $V_{REF}$, the temperature resolution Res [° C.], and the electric resistance value $R_S$ of the shunt resistor 70. In the fourth example, the resistance temperature coefficient α of the load 21 is 4000 [ppm/° C.], which is different from the first example illustrated in FIG. 8. Therefore, in the following description of FIG. 11, descriptions of the same points as those in the first example illustrated in FIG. 8 will be omitted as appropriate. As described above, the resistance temperature coefficient α=4000 [ppm/° C.] can be realized by forming the load 21 by tungsten.

In FIG. 11, a temperature resolution Res 41 indicates the relationship between the temperature resolution Res [° C.] and the electric resistance value $R_S$ when the reference voltage $V_{REF}$ is 3.7 [V]. A temperature resolution Res 42 indicates the relationship between the temperature resolution Res [° C.] and the electric resistance value $R_S$ when the reference voltage $V_{REF}$ is 3.0 [V].

In FIG. 11, a temperature resolution Res 43 indicates the relationship between the temperature resolution Res [° C.] and the electric resistance value $R_S$ when the reference voltage $V_{REF}$ is 2.0 [V]. A temperature resolution Res 44 indicates the relationship between the temperature resolution Res [° C.] and the electric resistance value $R_S$ when the reference voltage $V_{REF}$ is 1.0 [V].

In FIG. 11, a temperature resolution Res 45 indicates the relationship between the temperature resolution Res [° C.] and the electric resistance value $R_S$ when the reference voltage $V_{REF}$ is 0.5 [V].

In the case of the fourth example illustrated in FIG. 11, that is, when the resistance temperature coefficient α of the load 21 is 4000 [ppm/° C.] and the amplification factor A of the operational amplifier 56 is 1, the temperature resolution Res [° C.]≤10 [° C.] can be realized regardless of magnitude of the electric resistance value $R_S$ (provided that the electric resistance value $R_S$≤50 [Ω]). Further, it can be seen that the temperature resolution Res [° C.]≤1 [° C.] can also be realized in a partial range of the temperature resolutions Res 42 to Res 45. It should be noted that the temperature resolution Res [° C.] does not become equal to or less than 0.1 [° C.] in the case of the fourth example illustrated in FIG. 11.

(Optimization of Amplification Factor of Operational Amplifier)

Next, the temperature resolution Res [° C.] will be considered in a case where the optimization of the amplification factor A of the operational amplifier 56 is also combined.

It can be seen from the above formula (F7) that the temperature resolution Res [° C.] can be reduced when the amplification factor A of the operational amplifier 56 is more than 1. However, as described above, in order to appropriately operate the analog-digital converter 57, it is necessary to set the amplification factor A of the operational amplifier 56 such that the voltage value of the voltage signal $A·V_{IN}$ input from the operational amplifier 56 to the analog-digital converter 57 is equal to or less than the voltage value of the reference voltage $V_{REF}$. Therefore, here, the amplification factor A of the operational amplifier 56 is considered to be larger than 1 on a premise that the voltage value of the voltage signal $A·V_{IN}$ is less than the voltage value of the reference voltage $V_{REF}$.

Figure 12:
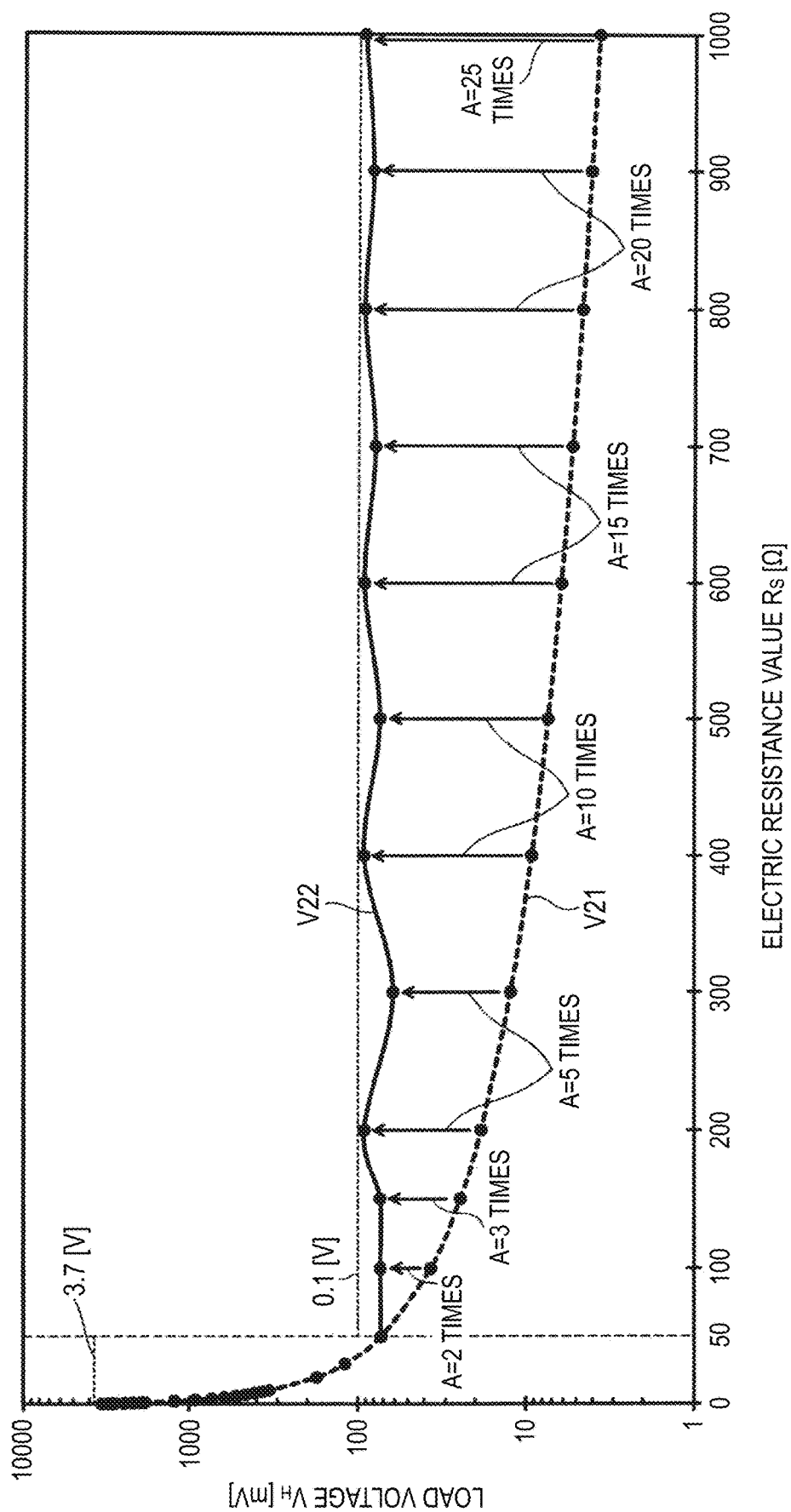
FIG. 12 illustrates an example of a voltage signal output by an operational amplifier.

In FIG. 12, a dotted line denoted by a reference numeral V21 represents the input voltage $V_{IN}$ in a case where the electric resistance value $R_S$ of the shunt resistor 70 is a value illustrated on a horizontal axis of FIG. 12 while the load voltage $V_H$ is a value illustrated on the vertical axis of FIG. 12. In FIG. 12, a solid line denoted by a reference numeral V22 represents the voltage signal $A·V_{IN}$ obtained by amplifying the input voltage $V_{IN}$ denoted by the reference numeral V21 with the amplification factor A which is larger than 1.

The voltage signal $A·V_{IN}$ denoted by the reference numeral V22 is the voltage signal $A·V_{IN}$ obtained by amplifying the input voltage $V_{IN}$ with each amplification factor A illustrated in FIG. 12 so as to be as large as possible in such a range that the reference voltage $V_{REF}$ is 100 [mV] (that is, 0.1 [V]) in a case where the electric resistance value $R_S$ of the shunt resistor 70 is 50 [Ω] or more.

Specifically, in the example illustrated in FIG. 12, the voltage signal $A·V_{IN}$ is amplified while being contained within a range below the reference voltage $V_{REF}$ by setting the amplification factor A to 2 in a case where the electric resistance value $R_S$ is 100 [Ω]. The voltage signal $A·V_{IN}$ is amplified while being contained within the range below the reference voltage $V_{REF}$ by setting the amplification factor A to 3 in a case where the electric resistance value $R_S$ is 150 [Ω]. The voltage signal $A·V_{IN}$ is amplified while being contained within the range below the reference voltage $V_{REF}$ by setting the amplification factor A to 5 in a case where the electric resistance value $R_S$ is 200 [Ω].

Similarly, the voltage signal $A \cdot V_{IN}$ is amplified while being contained within the range below the reference voltage $V_{REF}$ by setting the amplification factor A to 5 in a case where the electric resistance value $R_S$ is 300 [Ω], setting the amplification factor A to 10 in a case where the electric resistance value $R_S$ is 400 [Ω] or 500 [Ω], setting the amplification factor A to 15 in a case where the electric resistance value $R_S$ is 600 [Ω] or 700 [Ω], setting the amplification factor A to 20 in a case where the electric resistance value $R_S$ is 800 [Ω] or 900 [Ω] and setting the amplification factor A to 25 in a case where the electric resistance value $R_S$ is 1000 [Ω].

(Specific Relationship Between Reference Voltage, Temperature Resolution and Electric Resistance Value of Shunt Resistor when Optimization of Amplification Factor is Combined)

Next, the specific relationship between the reference voltage $V_{REF}$, the temperature resolution Res [° C.], and the electric resistance value $R_S$ of the shunt resistor 70 in a case where the optimization of the amplification factor A of the operational amplifier 56 is also combined will be described.

Figure 13:
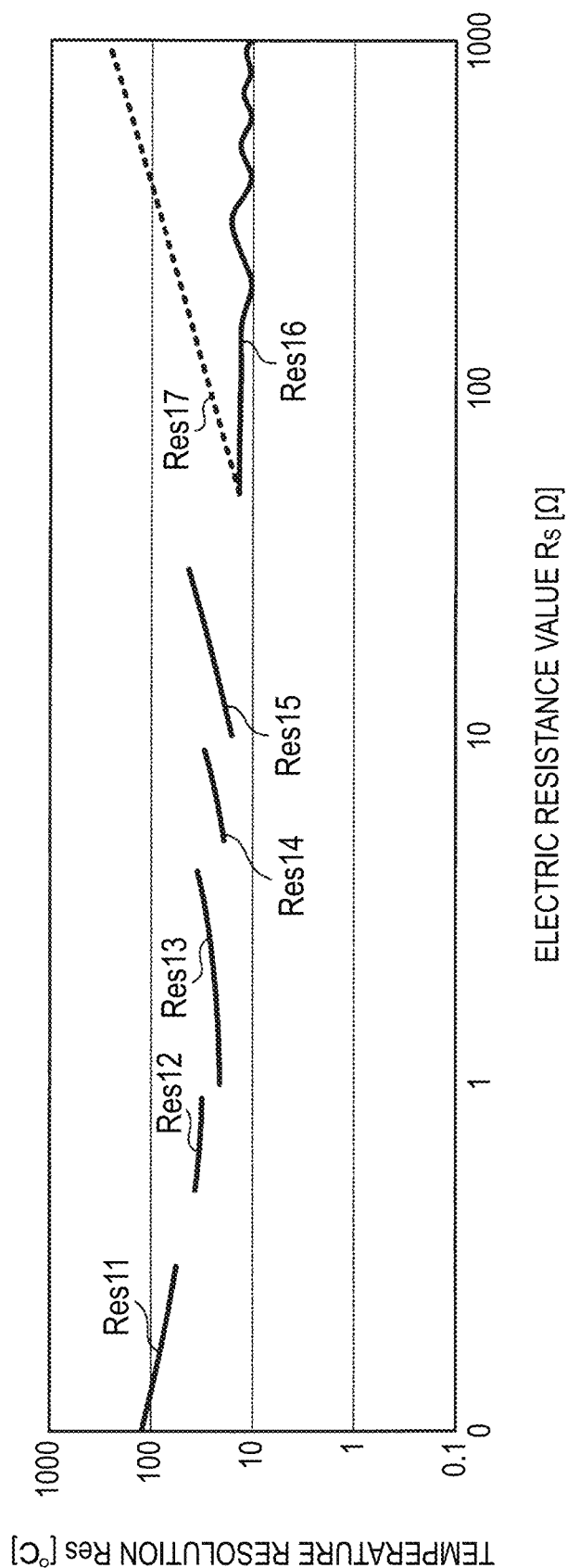
FIG. 13 illustrates a fifth example of the relationship between the reference voltage, the temperature resolution, and the electric resistance value of the shunt resistor in a state where the voltage signal of FIG. 12 is used under conditions of the first example of FIG. 8.

FIG. 13 illustrates a fifth example of the relationship between the reference voltage $V_{REF}$, the temperature resolution Res [° C.], and the electric resistance value $R_S$ of the shunt resistor 70. The fifth example is an example in which the electric resistance value $R_S$ is equal to or larger than 50 [Ω] in the first example illustrated in FIG. 8 and the voltage signal $A \cdot V_{IN}$ illustrated in FIG. 12 is used in the case where the electric resistance value $R_S \geq 50$ [Ω]. That is, in the fifth example, the voltage signal $A \cdot V_{IN}$ illustrated in FIG. 12 is used in the case where the electric resistance value $R_S \geq 50$ [Ω], which is different from the first example illustrated in FIG. 8. Therefore, in a description of FIG. 13, descriptions of the same points as those in the first example illustrated in FIG. 8 will be omitted as appropriate. It should be noted that in the fifth example illustrated in FIG. 13, a horizontal axis has a logarithmic scale. In FIG. 13, illustration of the load voltage $V_H$ is omitted.

In the fifth example illustrated in FIG. 13, when the electric resistance value $R_S \geq 50$ [Ω], the reference voltage $V_{REF}$ is 100 [mV] (that is, 0.1 [V]). In FIG. 13, a temperature resolution Res 16 denoted by a solid line is the temperature resolution Res [° C.] obtained by using the voltage signal $A \cdot V_{IN}$ illustrated in FIG. 12. That is, the temperature resolution Res [° C.] obtained by amplifying the input voltage $V_{IN}$ by the operational amplifier 56 with the amplification factor A described in FIG. 12. Meanwhile, in FIG. 13, a temperature resolution Res 17 denoted by a dotted line is the temperature resolution Res [° C.] obtained in a case where the input voltage $V_{IN}$ is not amplified.

As illustrated in the temperature resolution Res 16 and the temperature resolution Res 17, by amplifying the input voltage $V_{IN}$ by the operational amplifier 56 with the amplification factor A described in FIG. 12, the temperature resolution Res [° C.] can be reduced as compared with the case where the input voltage $V_{IN}$ is not amplified. There are cases where the temperature resolution Res [° C.]≤10 [° C.] can be realized even when a resistor having an electric resistance value of 50 [Ω] or more is used as the shunt resistor 70. It should be noted that the temperature resolution Res [° C.] does not become equal to or less than 5 [° C.] in the case of the fifth example illustrated in FIG. 13.

Figure 14:
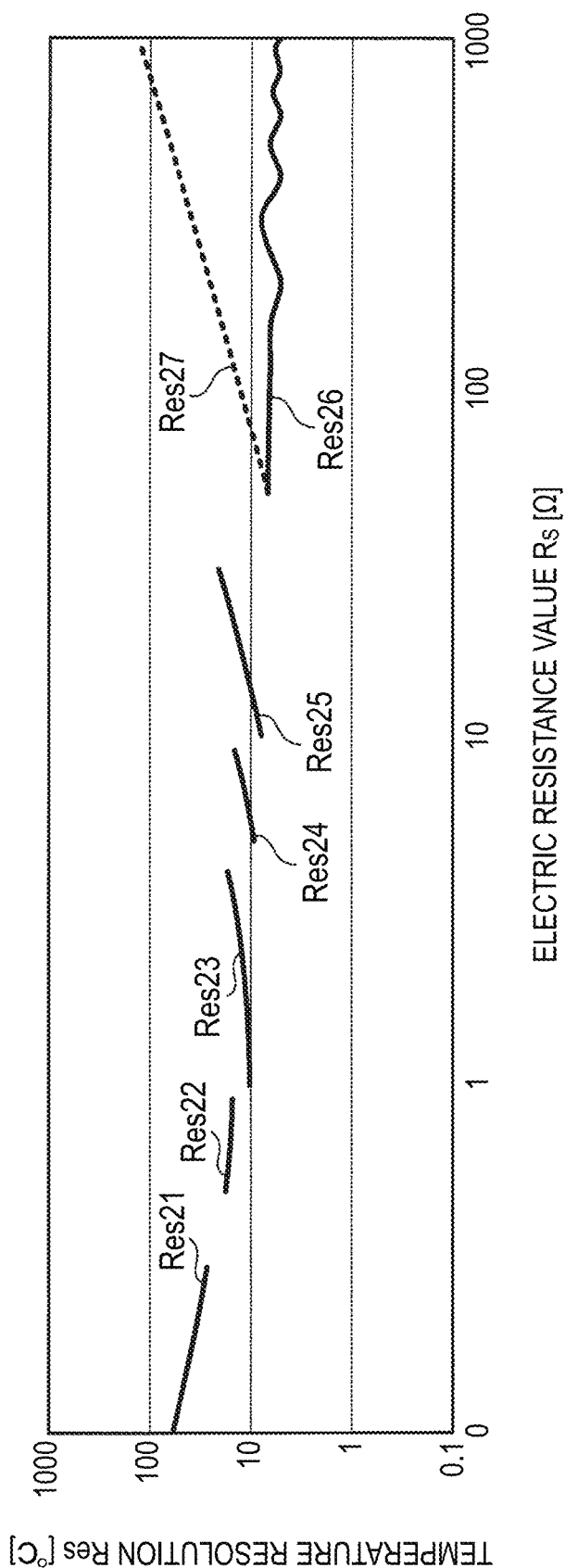
FIG. 14 illustrates a sixth example of the relationship between the reference voltage, the temperature resolution, and the electric resistance value of the shunt resistor in a state where the voltage signal of FIG. 12 is used under conditions of the second example of FIG. 9.

FIG. 14 illustrates a sixth example of the relationship between the reference voltage $V_{REF}$, the temperature resolution Res [° C.], and the electric resistance value $R_S$ of the shunt resistor 70. The sixth example is an example in which the electric resistance value $R_S$ is equal to or larger than 50 [Ω] in the second example illustrated in FIG. 9 and the voltage signal $A \cdot V_{IN}$ illustrated in FIG. 12 is used in the case where the electric resistance value $R_S \geq 50$ [Ω]. That is, in the sixth example, the voltage signal $A \cdot V_{IN}$ illustrated in FIG. 12 is used in the case where the electric resistance value $R_S \geq 50$ [Ω], which is different from the second example illustrated in FIG. 9. Therefore, in a description of FIG. 14, descriptions of the same points as those in the second example illustrated in FIG. 9 will be omitted as appropriate. It should be noted that in the sixth example illustrated in FIG. 14, a horizontal axis has a logarithmic scale. In FIG. 14, the illustration of the load voltage $V_H$ is omitted.

In the sixth example illustrated in FIG. 14, when the electric resistance value $R_S \geq 50$ [Ω], the reference voltage $V_{REF}$ is 100 [mV] (that is, 0.1 [V]). In FIG. 14, a temperature resolution Res 26 denoted by a solid line is the temperature resolution Res [° C.] obtained by using the voltage signal $A \cdot V_{IN}$ illustrated in FIG. 12. That is, the temperature resolution Res [° C.] obtained by amplifying the input voltage $V_{IN}$ by the operational amplifier 56 with the amplification factor A described in FIG. 12. Meanwhile, in FIG. 14, a temperature resolution Res 27 denoted by a dotted line is the temperature resolution Res [° C.] obtained in the case where the input voltage $V_{IN}$ is not amplified.

As illustrated in the temperature resolution Res 26 and the temperature resolution Res 27, by amplifying the input voltage $V_{IN}$ by the operational amplifier 56 with the amplification factor A described in FIG. 12, the temperature resolution Res [° C.] can be reduced as compared with the case where the input voltage $V_{IN}$ is not amplified. The temperature resolution Res [° C.]≤10 [° C.] can be realized even when a resistor having an electric resistance value of 50 [Ω] or more is used as the shunt resistor 70. It should be noted that the temperature resolution Res [° C.] does not become equal to or less than 1 [° C.] in the case of the sixth example illustrated in FIG. 14.

Figure 15:
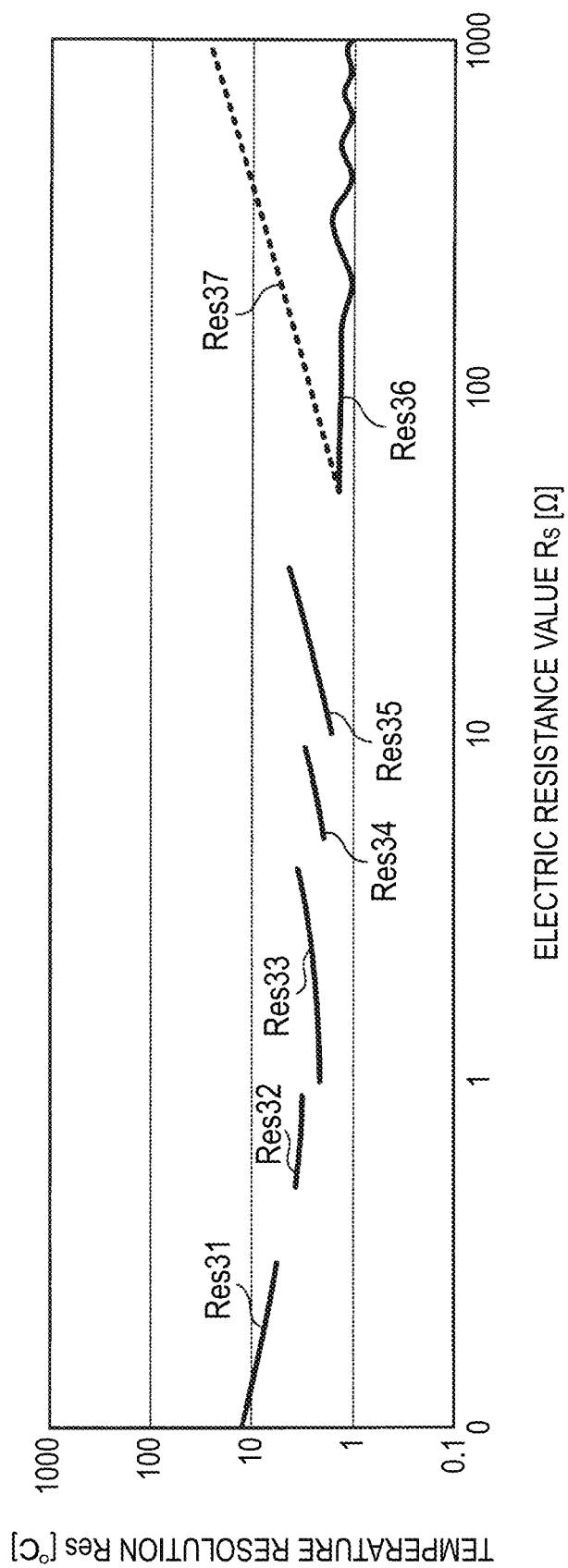
FIG. 15 illustrates a seventh example of the relationship between the reference voltage, the temperature resolution, and the electric resistance value of the shunt resistor in a state where the voltage signal of FIG. 12 is used under conditions of the third example of FIG. 10.

FIG. 15 illustrates a seventh example of the relationship between the reference voltage $V_{REF}$, the temperature resolution Res [° C.], and the electric resistance value $R_S$ of the shunt resistor 70. The seventh example is an example in which the electric resistance value $R_S$ is equal to or larger than 50 [Ω] in the third example illustrated in FIG. 10 and the voltage signal $A \cdot V_{IN}$ illustrated in FIG. 12 is used in the case where the electric resistance value $R_S$ 50 [Ω]. That is, in the seventh example, the voltage signal $A \cdot V_{IN}$ illustrated in FIG. 12 is used in the case where the electric resistance value $R_S \geq 50$ [Ω], which is different from the third example illustrated in FIG. 10. Therefore, in a description of FIG. 15, descriptions of the same points as those in the third example illustrated in FIG. 10 will be omitted as appropriate. It should be noted that in the seventh example illustrated in FIG. 15, a horizontal axis has a logarithmic scale. In FIG. 15, the illustration of the load voltage $V_H$ is omitted.

In the seventh example illustrated in FIG. 15, when the electric resistance value $R_S \geq 50$ [Ω], the reference voltage $V_{REF}$ is 100 [mV] (that is, 0.1 [V]). In FIG. 15, a temperature resolution Res 36 denoted by a solid line is the temperature resolution Res [° C.] obtained by using the voltage signal $A \cdot V_{IN}$ illustrated in FIG. 12. That is, the temperature resolution Res [° C.] obtained by amplifying the input voltage $V_{IN}$ by the operational amplifier 56 with the amplification factor A described in FIG. 12. Meanwhile, in FIG. 15, a temperature resolution Res 37 denoted by a dotted line is the temperature resolution Res [° C.] obtained in the case where the input voltage $V_{IN}$ is not amplified.

As illustrated in the temperature resolution Res 36 and the temperature resolution Res 37, by amplifying the input voltage $V_{IN}$ by the operational amplifier 56 with the amplification factor A described in FIG. 12, the temperature resolution Res [° C.] can be reduced as compared with the case where the input voltage $V_{IN}$ is not amplified. The temperature resolution Res [° C.]≤10 [° C.] can be realized even when a resistor having an electric resistance value of 50 [Ω] or more is used as the shunt resistor 70 and further there are cases where the temperature resolution Res [° C.]≤1 [° C.] can be realized. It should be noted that the temperature resolution Res [° C.] does not become equal to or less than 0.5 [° C.] in the case of the seventh example illustrated in FIG. 15.

Figure 16:
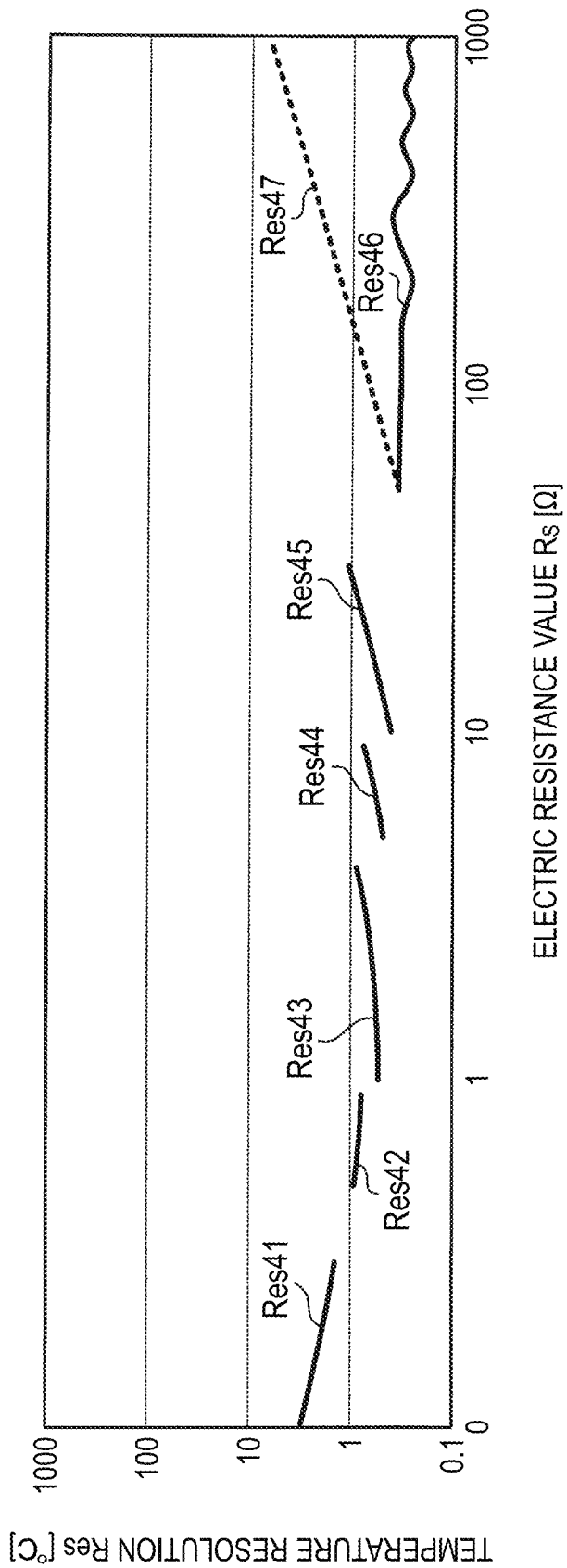
FIG. 16 illustrates a eighth example of the relationship between the reference voltage, the temperature resolution, and the electric resistance value of the shunt resistor in a state where the voltage signal of FIG. 12 is used under conditions of the fourth example of FIG. 11.

FIG. 16 illustrates an eighth example of the relationship between the reference voltage $V_{REF}$, the temperature resolution Res [° C.], and the electric resistance value $R_S$ of the shunt resistor 70. The eighth example is an example in which the electric resistance value $R_S$ is equal to or larger than 50 [Ω] in the fourth example illustrated in FIG. 11 and the voltage signal $A \cdot V_{IN}$ illustrated in FIG. 12 is used in the case where the electric resistance value $R_S \geq 50$ [Ω]. That is, in the eighth example, the voltage signal $A \cdot V_{IN}$ illustrated in FIG. 12 is used in the case where the electric resistance value $R_S \geq 50$ [Ω], which is different from the fourth example illustrated in FIG. 11. Therefore, in a description of FIG. 16, descriptions of the same points as those in the fourth example illustrated in FIG. 11 will be omitted as appropriate. It should be noted that in the eighth example illustrated in FIG. 16, a horizontal axis has a logarithmic scale. In FIG. 16, the illustration of the load voltage $V_H$ is omitted.

In the eighth example illustrated in FIG. 16, when the electric resistance value $R_S \geq 50$ [Ω], the reference voltage $V_{REF}$ is 100 [mV] (that is, 0.1 [V]). In FIG. 16, a temperature resolution Res 46 denoted by a solid line is the temperature resolution Res [° C.] obtained by using the voltage signal $A \cdot V_{IN}$ illustrated in FIG. 12. That is, the temperature resolution Res [° C.] obtained by amplifying the input voltage $V_{IN}$ by the operational amplifier 56 with the amplification factor A described in FIG. 12. Meanwhile, in FIG. 16, a temperature resolution Res 47 denoted by a dotted line is the temperature resolution Res [° C.] obtained in the case where the input voltage $V_{IN}$ is not amplified.

As illustrated in the temperature resolution Res 46 and the temperature resolution Res 47, by amplifying the input voltage $V_{IN}$ by the operational amplifier 56 with the amplification factor A described in FIG. 12, the temperature resolution Res [° C.] can be reduced as compared with the case where the input voltage $V_{IN}$ is not amplified. The temperature resolution Res [° C.]≤1 [° C.] can be realized even when a resistor having an electric resistance value of 50 [Ω] or more is used as the shunt resistor 70. It should be noted that the temperature resolution Res [° C.] does not become equal to or less than 0.1 [° C.] in the case of the eighth example illustrated in FIG. 16.

As described above, according to the power supply unit 10 and the aerosol inhaler 1 including the power supply unit 10 of the present embodiment, the temperature resolution Res [° C.]≤10 [° C.] can be realized by performing at least one of the optimization of the resistance temperature coefficient α of the load 21, the optimization of the reference voltage $V_{REF}$ and the optimization of the amplification factor A of the operational amplifier 56. Therefore, even when the operational amplifier 56 for amplifying the output of the load voltage sensor 17 is not provided or when the amplification factor A of the operational amplifier 56 is minimized, the temperature T of the load can be accurately acquired.

(Modification of Power Supply Unit 10)

Figure 17:
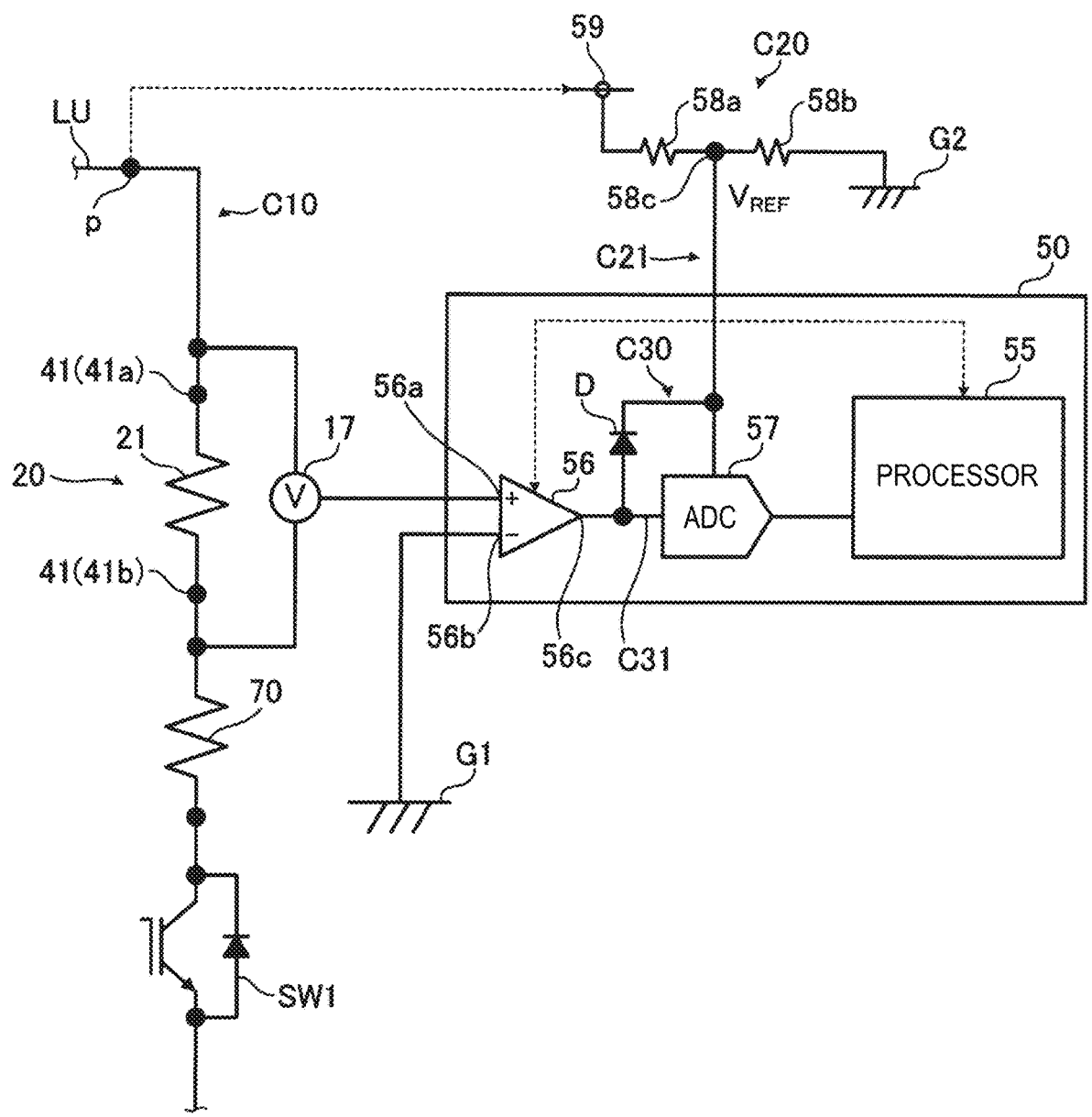
FIG. 17 illustrates a modification of the circuit configuration of the power supply unit.

Next, a modification of the power supply unit 10 will be described. The electric circuit of the power supply unit 10 may be configured as illustrated in FIG. 17, for example. Specifically, the load 21 and the load voltage sensor 17 which are connected in parallel in the above embodiment, the shunt resistor 70, and the first switch SW1 may be connected in series in such an order to form the heating and measurement circuit C10. In this case, one end of the heating and measurement circuit C10 on the side of the load 21 and the load voltage sensor 17 is connected to the main positive bus LU, and the other end of the heating and measurement circuit C10 on the side of the first switch SW1 is connected to the main negative bus LD or ground (that is, the voltage value is "0 (zero)").

Even when the power supply unit 10 includes the electric circuit illustrated in FIG. 17, the temperature resolution Res [° C.]≤10 [° C.] can be realized by performing at least one of the optimization of the resistance temperature coefficient α of the load 21, the optimization of the reference voltage $V_{REF}$ and the optimization of the amplification factor A of the operational amplifier 56 as described above, and the temperature T of the load 21 can be accurately acquired with a simple configuration.

(Value that Temperature Resolution Res [° C.] can Take Under Each Condition)

Finally, the embodiment described above will be summarized.

FIG. 18 illustrates values that the temperature resolution Res [° C.] can take under each condition. In FIG. 18, "no optimization of reference voltage $V_{REF}$" means that the reference voltage $V_{REF}$ is set to 3.7 [V] without performing the above-described optimization of the reference voltage $V_{REF}$. On the other hand, "with optimization of reference voltage $V_{REF}$" means that the reference voltage $V_{REF}$ is optimized as described above and the reference voltage $V_{REF}$ is smaller than 3.7 [V].

In FIG. 18, "no optimization of amplification factor A" means that the amplification factor A is 1 (that is, no amplification) without performing the above-described optimization of the amplification factor A. On the other hand, "with optimization of amplification factor A" means that the amplification factor A is optimized as described above and the amplification factor A is greater than 1 (that is, amplification is performed).

In FIG. 18, the temperature resolution Res [° C.] illustrated by pattern 1 indicates possibility that the accuracy of the temperature T that can be acquired cannot be ensured since the temperature resolution is rough, and quality of control performed based on the temperature T is deteriorated. The temperature resolution Res [° C.] illustrated by pattern 2 indicates possibility that the accuracy of the temperature T that can be acquired can be ensured to some extent since the temperature resolution is to some extent fine, and quality of control other than temperature control of the load 21 performed based on the temperature T can be secured. The temperature resolution Res [° C.] illustrated by pattern 3 indicates possibility that the accuracy of the temperature T that can be acquired can be ensured since the temperature resolution is sufficiently fine, and the quality of the temperature control of the load 21 performed based on the temperature T can also be secured.

As illustrated in FIG. 18, it can be seen that by optimizing the reference voltage $V_{REF}$, there are more conditions under which good temperature resolution Res [° C.] can be obtained as compared with a case where the reference voltage $V_{REF}$ is not optimized. Further, it can be seen that by performing the optimization of the amplification factor A in combination, there are still more conditions under which good temperature resolution Res [° C.] can be obtained as compared with a case where the amplification factor A is not optimized.

Although the step-down circuit C20 is provided in the power supply unit 10 and the voltage decreased by the step-down circuit C20 is applied to the analog-digital converter 57 in the above-described embodiment and modification, the present disclosure is not limited thereto.

For example, when the load 21 is formed of tungsten, as illustrated in FIG. 18, a certain degree of temperature resolution Res [° C.] can be secured even if the reference voltage $V_{REF}$ is not optimized. When the certain degree of temperature resolution Res [° C.] can be secured in this way without optimizing the reference voltage $V_{REF}$, a voltage (for example, 3.7 [V]) output from the LDO regulator 60 may be applied to the analog-digital converter 57 without providing the step-down circuit C20.

Although the first cartridge 20 including the load 21 is detachably attached to the power supply unit 10 in the above-described embodiment and modification, the first cartridge 20 including the load 21 may also be integrated with the power supply unit 10.

The present specification describes at least the following matters. Corresponding components in the above embodiment are shown in parentheses. However, the present disclosure is not limited thereto.

(1) A control device (the power supply unit 10) of an aerosol inhaler (the aerosol inhaler 1) including a load (the load 21) heating an aerosol generation source (the aerosol source 22, the flavor source 31), a temperature and an electric resistance value of the load being correlated, includes:

a voltage sensor (the load voltage sensor 17) configured to output a voltage value applied to the load;

a known resistor (the shunt resistor 70) which is connected in series to the load; and a control circuit (the control circuit 50) configured to acquire the temperature of the load based on output of the voltage sensor, in which the control circuit is configured such that a resolution of the temperature of the load acquired based on the output of the voltage sensor is 10 [° C.] or less.

According to (1), since the resolution of the temperature of the load acquired by the control circuit is 10° C. or less based on the output of the voltage sensor that outputs the voltage value applied to the load which is connected in series with the known resistor, the temperature of the load can be acquired with appropriate accuracy.

(2) The control device of the aerosol inhaler according to (1), in which the control circuit includes an analog-digital converter (the analog-digital converter 57) to which the output of the voltage sensor is input, and the analog-digital converter is configured such that the output of the voltage sensor is input without being amplified.

According to (2), since the output of the voltage sensor is input to the analog-digital converter without being amplified, noise included in the output of the voltage sensor can be prevented from being amplified, and accuracy of the temperature of the load acquired based on the output can be improved.

(3) The control device of the aerosol inhaler according to (1), in which the control circuit includes an analog-digital converter (the analog-digital converter 57) to which the output of the voltage sensor is input, and a voltage applied to a series circuit (the first circuit C11) formed by the known resistor and the load is equal to a reference voltage which is applied to the analog-digital converter so as to operate the analog-digital converter.

According to (3), since the voltage applied to the series circuit formed by the known resistor and the load is equal to the reference voltage applied to the analog-digital converter, a voltage that is higher than the reference voltage can be prevented from being input to the analog-digital converter. In other words, the analog-digital converter can be protected.

(4) An aerosol inhaler including the control device according to (3), in which the load included in the aerosol inhaler has a resistance temperature coefficient of 1000 [ppm/° C.] or more.

According to (4), since the load has a resistance temperature coefficient of 1000 [ppm/° C.] or more, the resolution of the temperature of the load can be reduced, and the temperature of the load can be acquired with appropriate accuracy.

(5) The control device of the aerosol inhaler according to (1), in which the known resistor has an electric resistance value of 10 [Ω] or more.

According to (5), since the known resistor has an electric resistance value of 10 [Ω] or more, the known resistor can be realized through using a resistor that is easy to procure.

(6) The control device of the aerosol inhaler according to (5), in which the control circuit includes an analog-digital converter (the analog-digital converter 57) to which the output of the voltage sensor is input, and a reference voltage which is applied to the analog-digital converter so as to operate the analog-digital converter is lower than a voltage applied to a series circuit (the first circuit C11) formed by the known resistor and the load.

According to (6), since the reference voltage applied to the analog-digital converter is lower than the voltage applied to the series circuit formed by the known resistor and the load, the resolution of the temperature of the load can be reduced, and the temperature of the load can be acquired with appropriate accuracy.

(7) The control device of the aerosol inhaler according to (6), in which the analog-digital converter is configured such that the output of the voltage sensor is input without being amplified.

According to (7), since the output of the voltage sensor is input to the analog-digital converter without being amplified, the noise included in the output of the voltage sensor can be prevented from being amplified, and the accuracy of the temperature of the load acquired based on the output can be improved.

(8) The control device of the aerosol inhaler according to (7), in which the control circuit is configured such that a resolution of the temperature of the load acquired based on the output of the voltage sensor is 5 [° C.] or less.

According to (8), since the control circuit is configured such that the resolution of the temperature of the load acquired based on the output of the voltage sensor is 5 [° C.] or less, the resolution of the temperature of the load can be reduced, and the temperature of the load can be acquired with appropriate accuracy.

(9) The control device of the aerosol inhaler according to (8), in which the known resistor has an electric resistance value of 25 [Ω] or more.

According to (9), since the known resistor has an electric resistance value of 25 [Ω] or more, a decrease in the accuracy of the temperature of the load caused by Joule heat generated by the known resistor when acquiring the temperature of the load can be prevented, and the temperature of the load can be acquired with appropriate accuracy.

(10) The control device of the aerosol inhaler according to (8), in which
the known resistor has an electric resistance value which makes power consumption of the known resistor equal to or less than rated power of the known resistor when power is supplied to the series circuit.

According to (10), since the known resistor has an electric resistance value which makes the power consumption of the known resistor equal to or less than the rated power of the known resistor when power is supplied to the series circuit, heat generation and breakage of the known resistor when acquiring the temperature of the load can be prevented.

(11) An aerosol inhaler including the control device according to (10), in which
the load included in the aerosol inhaler is formed of stainless steel.

According to (11), since the load is formed of stainless steel which has a certain degree of resistance temperature coefficient, the resolution of the temperature of the load can be reduced, and the temperature of the load can be acquired with appropriate accuracy.

(12) The control device of the aerosol inhaler according to (6) further includes:
an amplifier (the operational amplifier 56) configured to amplify the output of the voltage sensor input to the analog-digital converter.

According to (12), since the amplifier configured to amplify the output of the voltage sensor input to the analog-digital converter is provided, the resolution of the temperature of the load can be further reduced by amplification of the output, and the temperature of the load can be acquired with appropriate accuracy.

(13) The control device of the aerosol inhaler according to (6) further includes:
a circuit (the step-down circuit C20, the input circuit C21) in which a voltage equal to the voltage applied to the series circuit is input, the voltage being decreased to the reference voltage and applied to the analog-digital converter.

According to (13), since the circuit is provided such that the voltage equal to the voltage applied to the series circuit is input therein, decreased to the reference voltage and applied to the analog-digital converter, the reference voltage can be lowered by a simple configuration, and the resolution of the temperature of the load can be reduced due to the lowering of the reference voltage.

(14) The control device of the aerosol inhaler according to (13) further includes:
a voltage converter (the LDO regulator 60) capable of outputting a constant voltage, in which
the voltage converter and a node (the node p) which connects the series circuit and the circuit are connected in series.

According to (14), the voltage converter capable of outputting the constant voltage can supply a stable voltage to the series circuit formed by the known resistor and the load and the circuit that applies the reference voltage to the analog-digital converter.

(15) The control device of the aerosol inhaler according to (8) further includes:
a clamp circuit (the clamp circuit C30) connected to a circuit (the circuit 31) which inputs the output of the voltage sensor to the analog-digital converter and a circuit (the input circuit C21) which applies the reference voltage to the analog-digital converter.

According to (15), since the clamp circuit connected to the circuit which inputs the output of the voltage sensor to the analog-digital converter and the circuit which applies the reference voltage to the analog-digital converter is provided, a voltage of the voltage signal input to the analog-digital converter can be prevented from being higher than the reference voltage. In other words, the analog-digital converter can be protected.

(16) The control device of the aerosol inhaler according to (15) further includes:
an amplifier configured to amplify the output of the voltage sensor input to the analog-digital converter, in which
the amplifier is provided on an upstream side of the clamp circuit in the circuit which inputs the output of the voltage sensor to the analog-digital converter.

According to (16), since the amplifier is located upstream of the clamp circuit, the voltage signal input to the analog-digital converter can be prevented from being higher than the reference voltage even when amplification is performed by the amplifier. In other words, the analog-digital converter can be protected.

An aerosol inhaler (the aerosol inhaler 1) includes: a load (the load 21), which is configured to heat an aerosol generation source (the aerosol source 22, the flavor source 31) and is formed of stainless steel or nichrome having a resistance temperature coefficient of 200 [ppm/° C.] or more. The aerosol inhaler further includes:
a voltage sensor (the load voltage sensor 17) configured to output a voltage value applied to the load;
a known resistor (the shunt resistor 70) which is connected in series to the load; and
a control circuit (the control circuit 50) configured to acquire a temperature of the load based on output of the voltage sensor.

According to (17), the load connected in series with the known resistor is formed of stainless steel or nichrome having a resistance temperature coefficient of 200 [ppm/° C.] or more, and the control device acquires the temperature of the load based on the output of the voltage sensor that outputs the voltage value applied to the load, so that the resolution of the temperature of the load can be reduced, and the temperature of the load can be acquired with appropriate accuracy.

(18) The aerosol inhaler according to (17), in which
the known resistor has an electric resistance value of 10 [Ω] or more.

According to (18), since the known resistor has an electric resistance value of 10 [Ω] or more, the known resistor can be realized through using a resistor that is easy to procure.

(19) The aerosol inhaler according to (17), in which
the known resistor has an electric resistance value of 25 [Ω] or more.

According to (19), since the known resistor has an electric resistance value of 25 [Ω] or more, the decrease in the accuracy of the temperature of the load caused by the Joule heat generated by the known resistor when acquiring the temperature of the load can be prevented, and the temperature of the load can be acquired with appropriate accuracy.

(20) The aerosol inhaler according to (17), in which
the known resistor has an electric resistance value which makes power consumption of the known resistor equal to or less than rated power of the known resistor when power is supplied to a series circuit formed by the known resistor and the load.

According to (20), since the known resistor has an electric resistance value which makes the power consumption of the known resistor equal to or less than the rated power of the known resistor when power is supplied to the series circuit, heat generation and breakage of the known resistor when acquiring the temperature of the load can be prevented.

What is claimed is:

1. A control device of an aerosol inhaler including a load heating an aerosol generation source, a temperature and an electric resistance value of the load being correlated, the control device comprising:
    a voltage sensor connected in parallel with the load and configured to output a voltage value applied to the load;
    a known resistor which is connected in series to the load and has an electric resistance value of 10 [Ω] or more; and
    a control circuit configured to acquire the temperature of the load based on output of the voltage sensor, wherein
    the control circuit includes an analog-digital converter to which the output of the voltage sensor is input,
    the control circuit is configured such that a resolution of the temperature of the load acquired based on the output of the voltage sensor is 10 [° C.] or less, and
    a reference voltage which is applied to the analog-digital converter so as to operate the analog-digital converter is lower than a voltage applied to a series circuit formed by the known resistor and the load.

2. The control device of the aerosol inhaler according to claim 1, wherein the analog-digital converter is configured such that the output of the voltage sensor is input without being amplified.

3. The control device of the aerosol inhaler according to claim 2, wherein the control circuit is configured such that a resolution of the temperature of the load acquired based on the output of the voltage sensor is 5 [° C.] or less.

4. The control device of the aerosol inhaler according to claim 3, wherein the known resistor has an electric resistance value of 25 [Ω] or more.

5. The control device of the aerosol inhaler according to claim 3, wherein the known resistor has an electric resistance value which makes power consumption of the known resistor equal to or less than rated power of the known resistor when power is supplied to the series circuit.

6. An aerosol inhaler comprising the control device according to claim 5, wherein the load included in the aerosol inhaler is formed of stainless steel.

7. The control device of the aerosol inhaler according to claim 1, further comprising an amplifier configured to amplify the output of the voltage sensor input to the analog-digital converter.

8. The control device of the aerosol inhaler according to claim 1, further comprising a step-down circuit in which a voltage equal to the voltage applied to the series circuit is input, the voltage being decreased to the reference voltage and applied to the analog-digital converter.

9. The control device of the aerosol inhaler according to claim 8, further comprising:
    a voltage converter capable of outputting a constant voltage, wherein
    the voltage converter and a node which connects the series circuit and the step-down circuit are connected in series.

10. The control device of the aerosol inhaler according to claim 3, further comprising a clamp circuit connected to a circuit which inputs the output of the voltage sensor to the analog-digital converter and a circuit which applies the reference voltage to the analog-digital converter.

11. The control device of the aerosol inhaler according to claim 10, further comprising:
    an amplifier configured to amplify the output of the voltage sensor input to the analog-digital converter, wherein
    the amplifier is provided on an upstream side of the clamp circuit in the circuit which inputs the output of the voltage sensor to the analog-digital converter.

* * * * *